(12) United States Patent
Elmegreen et al.

(10) Patent No.: US 12,036,507 B2
(45) Date of Patent: Jul. 16, 2024

(54) COMPRESSIBLE FLUID SEPARATOR PUMP

(71) Applicant: International Business Machines Corporation, Armonk, NY (US)

(72) Inventors: Bruce Gordon Elmegreen, Goldens Bridge, NY (US); Binquan Luan, Chappaqua, NY (US)

(73) Assignee: International Business Machines Corporation, Armonk, NY (US)

(*) Notice: Subject to any disclaimer, the term of this patent is extended or adjusted under 35 U.S.C. 154(b) by 397 days.

(21) Appl. No.: 17/672,147

(22) Filed: Feb. 15, 2022

(65) Prior Publication Data
US 2023/0256383 A1   Aug. 17, 2023

(51) Int. Cl.
| | | |
|---|---|---|
| B01D 53/22 | (2006.01) | |
| B01D 53/02 | (2006.01) | |
| F04B 1/00 | (2020.01) | |
| F04B 53/00 | (2006.01) | |
| F04B 53/14 | (2006.01) | |

(52) U.S. Cl.
CPC ........... *B01D 53/229* (2013.01); *B01D 53/02* (2013.01); *F04B 1/00* (2013.01); *F04B 53/006* (2013.01); *F04B 53/14* (2013.01); *B01D 2053/221* (2013.01); *B01D 2257/504* (2013.01)

(58) Field of Classification Search
CPC ........ B01D 53/229; B01D 53/02; F04B 1/00; F04B 53/006; F04B 53/14
See application file for complete search history.

(56) References Cited

U.S. PATENT DOCUMENTS

| | | | |
|---|---|---|---|
| 3,121,625 | A | 2/1964 | Broughton |
| 4,264,338 | A | 4/1981 | Null |
| 4,561,865 | A | 12/1985 | McCombs |
| 6,032,484 | A | 3/2000 | Chernyakov |

(Continued)

FOREIGN PATENT DOCUMENTS

| | | | |
|---|---|---|---|
| CN | 115069116 A | * | 9/2022 |
| EP | 1852576 A2 | | 11/2007 |

(Continued)

OTHER PUBLICATIONS

Anonymous. "Carbon Engineering." Accessed Feb. 4, 2022. 5 pages. Published by Carbon Engineering. https://carbonengineering.com/our-technology/.

(Continued)

*Primary Examiner* — Robert A Hopkins
(74) *Attorney, Agent, or Firm* — Daniel M. Yeates

(57) ABSTRACT

A compressible fluid separator pump includes a crankshaft, four cylinders, and four pistons. Each cylinder includes an inlet including an inlet valve for mixed fluid comprising a target component and a discharge component, a reject outlet including a reject valve for a reject fluid, and a select outlet for a select fluid, wherein each of the select outlets includes a separator member that prefers the target component over the discharge component such that the target component is at a higher concentration in the select fluid than in the mixed fluid and in the reject fluid. Each piston is connected to the crankshaft and is positioned in one of the four cylinders, and the crankshaft is configured to position two of the pistons at top dead center when the other two of the pistons are at bottom dead center.

25 Claims, 12 Drawing Sheets

(56) References Cited

U.S. PATENT DOCUMENTS

| | | |
|---|---|---|
| 6,613,125 B1 | 9/2003 | Wallace |
| 7,964,020 B2 | 6/2011 | Baker |
| 8,025,715 B2 | 9/2011 | Wijmans |
| 8,119,091 B2 | 2/2012 | Keith |
| 8,220,247 B2 | 7/2012 | Wijmans |
| 8,591,633 B2 | 11/2013 | Ohuchi |
| 9,095,813 B2 | 8/2015 | Keith |
| 10,677,160 B2 | 6/2020 | Sundaram |
| 2018/0031315 A1 | 2/2018 | Baxter |
| 2018/0163711 A1 | 6/2018 | Follmar |
| 2019/0359894 A1 | 11/2019 | Heidel |

FOREIGN PATENT DOCUMENTS

| | | |
|---|---|---|
| GB | 647011 A | 12/1950 |
| GB | 2215403 A | 9/1989 |
| JP | 3765941 B2 | 4/2006 |
| WO | 2013191696 A1 | 12/2013 |

OTHER PUBLICATIONS

Anonymous. "Cylinder Pressure." Accessed Feb. 4, 2022. 3 pages. Published by Performance Trends Inc. https://performancetrends.com/Definitions/Cylinder-Pressure.htm.

Anonymous. "Expanders & air cooled heat exchangers." Accessed Feb. 4, 2022. 6 pages. Published by Baker Hughes. https://www.bakerhughes.com/expanders.

Anonymous. "Frequently Asked Questions (FAQs)." Accessed Feb. 4, 2022. 1 page. Published by EIA. https://www.eia.gov/tools/faqs/faq.php?id%1674&1%1611.

Anonymous. "Integrating Oxyfuel CO2 Purification Technologies with a Post-Combustion Capture Adsorption Unit." Published Apr. 5, 2017 by IP.com. 37 pages. https://ip.com/IPCOM/000249794.

Anonymous. "LiquidPiston Engines are Taking Off." Accessed Feb. 4, 2022. 16 pages. Published by LiquidPiston. https://www.liquidpiston.com/.

Anonymous. "Membrane solutions for Industrial separations." Accessed Feb. 4, 2022. 9 pages. Published by Membrane Technology Research. https://www.mtrinc.com/.

Anonymous. "National Carbon Capture Center." Accessed Feb. 4, 2022. 3 pages. Published by NC. https://www.nationalcarboncapturecenter.com/.

Anonymous. "Report extract Emissions." Accessed Feb. 4, 2022. 7 pages. Published by IEA. https://www.iea.org/reports/global-energy-co2-status-report-2019/emissions.

Anonymous. "Wyoming Integrated Test Center." Accessed Feb. 4, 2022. 3 pages. Published by Wyoming ITC. https://www.wyomingitc.org/.

Asen, Elke. "Carbon Taxes in Europe." Published Oct. 8, 2020 by Tax Foundation. 5 pages. https://taxfoundation.org/carbon-taxes-in-europe-2020/.

Batoon, et al., "Scale-Up and Testing of Advanced Polaris Membrane CO2 Capture Technology (DE-FE0031591)." Published Oct. 7, 2020 by Membrane Technology & Research. 22 pages. https://netl.doe.gov/sites/default/files/netl-file/20VPRCC_Merkel.pdf.

Bhown, et al., "Analysis and Status of Post-Combustion Carbon Dioxide Capture Technologies." Published Sep. 12, 2011 by ACS. 9 pages. In Environ. Sci. Technol. 2011, 45, 20, 8624-8632. https://doi.org/10.1021/es104291d.

Budinis, et al., "An assessment of CCS costs, barriers and potential." Published Nov. 2018 by Elsevier. 21 pages. In Energy Strategy Reviews 22, 61-81. https://doi.org/10.1016/j.esr.2018.08.003.

Bui, et al., "Carbon capture and storage (CCS): the way forward." Published Mar. 12, 2018. 115 pages. In Energy Environ. Sci., 2018, 11, 1062-1176. DOI: 10.1039/C7EE02342A.

Chen, et al., "Thermodynamic Study for Gas Absorption in Choline-2-pyrrolidine-carboxylic Acid + Polyethylene Glycol." Published Aug. 15, 2016 by ACS. 10 pages. In J. Chem. Eng. Data 2016, 61, 10, 3428-3437. https://doi.org/10.1021/acs.jced.6b00323.

Chowdhury, Mohammad. "Simulation, Design and Optimization of Membrane Gas Separation, Chemical Absorption and Hybrid Processes for CO2 Capture." Published in 2011 by Mohammad Hassan Murad Chowdhury. 407 pages.

Galizia, et al., "50th Anniversary Perspective: Polymers and Mixed Matrix Membranes for Gas and Vapor Separation: A Review and Prospective Opportunities." Published Oct. 3, 2017 by American Chemical Society. In Macromolecules 2017, 50, 7809-7843. 35pages. https://doi.org/10.1021/acs.macromol.7b01718.

Jiang, et al., "Post-combustion CO2 capture from a natural gas combined cycle power blant using activated carbon adsorption." Published Jul. 1, 2019 by Elsevier. 15 pages. In Applied Energy 245 (2019) 1-15. https://doi.org/10.1016/j.apenergy.2019.04.006.

Keith, et al., "A Process for Capturing CO2 from the Atmosphere." Published Aug. 15, 2018 by Elsevier. 23 pages. In Joule vol. 2, Issue 8, Aug. 15, 2018, pp. 1573-1594. https://doi.org/10.1016/j.joule.2018.05.006.

Khalilpour, et al., "Membrane-based carbon capture from flue gas: a review." Published Nov. 4, 2014 by Elsevier. 15 pages. In Journal of Cleaner Production 103 (2015) 286-300. http://dx.doi.org/10.1016/j.jclepro.2014.10.050.

Lei, et al., "Carbon membranes for CO2 removal: Status and perspectives from materials to processes." Published Dec. 1, 2020 by Elsevier. 17 pages. In Chemical Engineering Journal vol. 401. https://doi.org/10.1016/j.cej.2020.126084.

Li, et al., "Recent advances in gas storage and separation using metal-organic frameworks." Published Mar. 2018 by Elsevier. 14 pages. In Materials Today vol. 21, Issue 2, pp. 108-121. https://doi.org/10.1016/j.mattod.2017.07.006.

Lockwood, Toby. A Compararitive Review of Next-generation Carbon Capture Technologies for Coal-fired Power Plant. Published Jul. 2017 by Elsevier. 13 pages. In Energy Procedia 114 ( 2017 ) 2658-2670. DOI:10.1016/j.egypro.2017.03.1850.

Merkel, et al., "Power plant post-combustion carbon dioxide capture: An opportunity for membranes." Published Nov. 4, 2009 by Elsevier. 14 pages. In Journal of Membrane Science vol. 359, Issues 1-2, pp. 126-139. https://doi.org/10.1016/j.memsci.2009.10.041.

Mikulcic, et al., "Flexible Carbon Capture and Utilization technologies in future energy systems and the utilization pathways of captured CO2." Published Aug. 22, 2019 by Elsevier. 20 pages. In Renewable and Sustainable Energy Reviews, vol. 114, 109338. https://doi.org/10.1016/j.rser.2019.109338.

New York University. "How to calculate the social cost of carbon? Researchers offer roadmap in new analysis." Published Feb. 19, 2021 by Phys.org. 3 pages. https://phys.org/news/2021-02-social-carbon-roadmap-analysis.html.

Quintella, et al., "CO2 Capture Technologies: an Overview with Technology Assessment Based on Patents and Articles." Published Dec. 2011 by Elsevier. 8 pages. In Energy Procedia 4 (2011) 2050-2057. DOI:10.1016/j.egypro.2011.02.087.

Robeson, Lloyd. "The upper bound revisited." Published Apr. 22, 2008 by Elsevier. 11 pages. In Journal of Membrane Science, vol. 320, Issues 1-2, pp. 390-400. https://doi.org/10.1016/j.memsci.2008.04.030.

Rubin, Edward. "Improving cost estimates for advanced low-carbon power plants." Published May 30, 2019 by Elsevier. 9 pages. In International Journal of Greenhouse Gas Control, vol. 88, pp. 1-9. https://doi.org/10.1016/j.jggc.2019.05.019.

Shao, et al., "Simulation of membrane-based CO2 capture in a coal-fired power plant." Published Oct. 12, 2012 by Elsevier. 9 pages. In Journal of Membrane Science, vol. 427, pp. 451-459. https://doi.org/10.1016/j.memsci.2012.09.044.

Songolzadeh, et al., "Carbon Dioxide Separation from Flue Gases: A Technological Review Emphasizing Reduction in Greenhouse Gas Emissions." Published Feb. 17, 2014 by Hindawi Publishing Corporation. In The Scientific World Journal, vol. 2014, Article ID 828131. 34 pages. http://dx.doi.org/10.1155/2014/828131.

Wilberforce, et al., "Outlook of carbon capture technology and challenges." Published Dec. 4, 2018 by Elsevier. 17 pages. In Science of The Total Environment, vol. 657, pp. 56-72. https://doi.org/10.1016/j.scitotenv.2018.11.424.

Yeo, et al., "Conventional processes and membrane technology for carbon dioxide removal from natural gas: A review." Last revised

(56) References Cited

OTHER PUBLICATIONS

Feb. 28, 2012. 17 pages. In Journal of Natural Gas Chemistry, vol. 21, Issue 3, pp. 282-298. Published by Elsevier. https://doi.org/10.1016/S1003-9953(11)60366-6.

Yu, et al., "A Review of CO2 Capture by Absorption and Adsorption." Published in 2012 by Taiwan Association for Aerosol Research. 25 pages. In Aerosol and Air Quality Research, 12: 745-769. doi: 10.4209/aaqr.2012.05.0132.

Zhai, Haibo. "Advanced Membranes and Learning Scale Required for Cost-Effective Post-combustion Carbon Capture." Published Mar. 29, 2019 by Elsevier. 18 pages. In iScience vol. 13, pp. 440-451. https://doi.org/10.1016/j.sci.2019.03.006.

Wikipedia. "Wankel." Last updated May 17, 2018. 1 page. Published by Wikipedia. https://en.wikipedia.org/wiki/Wankel.

International Search Report and Written Opinion dated Apr. 21, 2023, for International Application No. PCT/EP2023/053683, filed Feb. 14, 2023.

\* cited by examiner

Valve Operation of the CO₂ Pump

| Stroke | Cylinder A | | Cylinder B | | Cylinder C | | Cylinder D | |
|---|---|---|---|---|---|---|---|---|
| | Valves (O=open, C=closed) | Action | Valves (O=open, C=closed) | Action | Valves (O=open, C=closed) | Action | Valves (O=open, C=closed) | Action |
| I | 136A-O<br>138A-C<br>142A-C | Mixed gas in valve 136A | 136B-C<br>138B-C<br>142B-O | Reject gas out valve 142B | 136C-C<br>138C-C<br>142C-C/O | Decompression: Mixed gas comes in at the end through valve 142C | 136D-C<br>138D-O<br>142D-C | Compression: select gas out valve 138D |
| II | 136A-C<br>138A-O<br>142A-C | Compression: select gas out valve 138A | 136B-O<br>138B-C<br>142B-C | Mixed gas in valve 136B | 136C-C<br>138C-C<br>142C-O | Reject gas out valve 142C | 136D-C<br>138D-C<br>142D-C/O | Decompression: Mixed gas comes in at the end through valve 142D |
| III | 136A-C<br>138A-C<br>142A-C/O | Decompression: Mixed gas comes in at the end through valve 142A | 136B-C<br>138B-O<br>142B-C | Compression: select gas out valve 138B | 136C-O<br>138C-C<br>142C-C | Mixed gas in valve 136C | 136D-C<br>138D-C<br>142D-O | Reject gas out valve 142D |
| IV | 136A-C<br>138A-C<br>142A-O | Reject gas out valve 142A | 136B-C<br>138B-C<br>142B-C/O | Decompression: Mixed gas comes in at the end through valve 142B | 136C-C<br>138C-O<br>142C-C | Compression: select gas out valve 138C | 136D-O<br>138D-C<br>142D-C | Mixed gas in valve 136D |

FIG. 5

| Stroke | Cylinders | Cylinders | Cylinders | Cylinders | Cylinders | Cylinders | Cylinders | Cylinders |
|---|---|---|---|---|---|---|---|---|
| I | O:J,N C:K,L,M | O:J,N C:K,L,M | All closed | O:KB,MA C:J,KA,MB,N,L | O:L,N C:J,K,M | O:J,N C:K,L,M | All closed | O:KA,MB C:J,KB,MA,N,L |
| II | O:KA,MB C:J,KB,MA,N,L | O:J,N C:K,L,M | O:L,N C:J,K,M | All closed | O:J,N C:K,L,M | O:KA,MB C:J,KB,MA,N,L | O:L,N C:J,K,M | All closed |
| III | All closed | O:KA,MB C:J,KB,MA,N,L | O:J,N C:K,L,M | O:L,N C:J,K,M | O:KB,MA C:J,KA,MB,N,L | All closed | O:J,N C:K,L,M | O:L,N C:J,K,M |
| IV | O:L,N C:J,K,M | All closed | O:KA,MB C:J,KB,MA,N,L | O:J,N C:K,L,M | All closed | O:L,N C:J,K,M | O:KB,MA C:J,KA,MB,N,L | O:J,N C:K,L,M |
| V | O:J,N C:K,L,M | O:L,N C:J,K,M | All closed | O:KB,MA C:J,KA,MB,N,L | O:J,N C:K,L,M | O:J,N C:K,L,M | All closed | O:KB,MA C:J,KA,MB,N,L |
| VI | O:KB,MA C:J,KA,MB,N,L | O:J,N C:K,L,M | O:KA,MB C:J,KB,MA,N,L | O:L,N C:J,K,M | O:J,N C:K,L,M | O:KA,MB C:J,KB,MA,N,L | O:L,N C:J,K,M | All closed |
| VII | All closed | O:KB,MA C:J,KA,MB,N,L | All closed | O:J,N C:K,L,M | O:KA,MB C:J,KB,MA,N,L | All closed | O:J,N C:K,L,M | O:L,N C:J,K,M |
| VIII | O:L,N C:J,K,M | All closed | O:KB,MA C:J,KA,MB,N,L | O:L,N C:J,K,M | O:J,N C:K,L,M | O:J,N C:K,L,M | O:KA,MB C:J,KB,MA,N,L | O:J,N C:K,L,M |

FIG. 12

COMPRESSIBLE FLUID SEPARATOR PUMP

BACKGROUND

The present disclosure relates to compressible fluid separation pumps, and more specifically, to gas separation pumps with gas membranes or sorbents.

The separation of a trace gas from other, more prevalent gases can be an important processing step for many applications, including natural gas extraction, chemical refining and manufacturing, production of specific gases in a healthcare setting (i.e., oxygen ($O_2$)), and removal of greenhouse gases from combustion products or the atmosphere (i.e., carbon dioxide ($CO_2$)). One method for separation is filtration, where a relatively high pressure mixture of trace gas and common gases are on one side of a selective membrane. Thereby, the trace gas is forced through the membrane into a collecting receptacle, whereas the common gases are discharged.

In some systems, the upstream side of the membrane is pressurized to urge the trace gas through the membrane, and the energy required for this filtration can be approximately the product of the compressive force times the forcing distance. Because the partial pressure of the trace gas in the mixture has to exceed the partial pressure of the same trace gas after filtration, a substantial portion of the compressive energy is wasted in compressing the common gas before the filtration. In other systems, the downstream side of the membrane has a vacuum pressure to urge the trace gas through the membrane. Such a system can require less energy because the pressure drop across the membrane is limited to the ambient pressure (e.g., the difference between atmospheric pressure and approximately zero pressure). However, the flow rates of such systems can be low, so the process requires substantially more time to perform.

Another method for separation is gas sorption (i.e., absorption or adsorption) that uses pressure-swing technology. In such a process, the mixed gas is compressed into a sorbing material at high pressure, trapping the trace gas which is then released into a receptacle at low pressure. As with membrane separation, pressure-swing sorption separation involves compressing the common gases too, which can waste energy.

SUMMARY

According to an embodiment of the present disclosure, a compressible fluid separator pump includes a crankshaft, four cylinders, and four pistons. Each cylinder includes an inlet including an inlet valve for mixed fluid comprising a target component and a discharge component, a reject outlet including a reject valve for a reject fluid, and a select outlet for a select fluid, wherein each of the select outlets includes a separator member that prefers the target component over the discharge component such that the target component is at a higher concentration in the select fluid than in the mixed fluid and in the reject fluid. Each piston is connected to the crankshaft and is positioned in one of the four cylinders, and the crankshaft is configured to position two of the pistons at top dead center when the other two of the pistons are at bottom dead center.

According to an embodiment of the present disclosure, a method of operating a compressible fluid separator pump includes rotating a crankshaft connected to four pistons, wherein each piston is positioned in one of four cylinders. Each cylinder includes an inlet including an inlet valve for mixed fluid comprising a target component and a discharge component, a reject outlet including a reject valve for the reject fluid, and a select outlet for the select fluid, wherein each of the select outlets includes a separator member that prefers the target component over the discharge component such that the target component is at a higher concentration in the select fluid than in the mixed fluid and in the reject fluid. The method also includes opening an inlet valve to one cylinder of the four cylinders while its piston is moving towards bottom dead center to draw mixed fluid into the one cylinder, closing the inlet valve to the one cylinder, compressing mixed fluid against the separator member of the one cylinder while its piston is moving towards top dead center, and decompressing the one cylinder while its piston is moving towards bottom dead center to assist in the rotating of the crankshaft to compress mixed fluid against a separator member of another cylinder while its piston is moving towards top dead center.

According to an embodiment of the present disclosure, a compressible fluid separator pump includes a crankshaft, eight cylinders, and eight pistons. Each cylinder includes a first inlet including a first inlet valve for mixed fluid comprising a target component and a discharge component, a first select outlet with a first outlet valve for the select fluid, wherein each of the first select outlets includes a first separator member that prefers the target component over the discharge component such that the target component is at a higher concentration in the select fluid than in the mixed fluid and in the reject fluid, and a second select outlet with a second outlet valve for the select fluid, wherein each of the second select outlets includes a second separator member that prefers the target component over the discharge component such that the target component is at a higher concentration in the select fluid than in the mixed fluid and in the reject fluid. Each piston is connected to the crankshaft and is positioned in one of the eight cylinders, wherein the crankshaft is configured to position four of the pistons at top dead center when the other four of the pistons are at bottom dead center.

According to an embodiment of the present disclosure, a method of operating a compressible fluid separator pump includes rotating a first crankshaft connected to eight pistons, wherein each piston is positioned in one of eight cylinders. Each cylinder includes a first inlet including a first inlet valve for mixed fluid comprising a target component and a discharge component, a first select outlet including a first outlet valve for the select fluid, wherein each of the first select outlets includes a first separator member that prefers the target component over the discharge component such that the target component is at a higher concentration in the select fluid than in the mixed fluid and in the reject fluid, and a second select outlet including a second outlet valve for the select fluid, wherein each of the second select outlets includes a second separator member that prefers the target component over the discharge component such that the target component is at a higher concentration in the select fluid than in the mixed fluid and in the reject fluid. The method also includes opening a first inlet valve to one first cylinder while its piston is moving towards bottom dead center to draw mixed fluid into the one cylinder, closing the first inlet valve to the one first cylinder, opening the first select outlet valve, compressing mixed fluid against the separator member of the one first cylinder while its piston is moving towards top dead center, and decompressing the one first cylinder while its piston is moving towards bottom dead center to assist in the rotating of the first crankshaft to compress mixed fluid against a separator member of another first cylinder while its piston is moving towards top dead center.

According to an embodiment of the present disclosure, a compressible fluid separator pump having a Wankel-type configuration includes a housing, a rotatable shaft, and an eccentric rotor. The housing includes a cavity, an inlet for mixed fluid that is fluidly connected to the cavity, wherein the mixed fluid comprises a target component and a discharge component, a reject outlet for reject fluid that is fluidly connected to the cavity, and a select outlet for the select fluid that is fluidly connected to the cavity, wherein the select outlet includes a separator member that prefers the target component over the discharge component such that the target component is at a higher concentration in the select fluid than in the mixed fluid and in the reject fluid, wherein the inlet and the reject outlet are on one side of the housing and the select outlet is on an opposite side of the housing. The rotatable shaft passes through the housing, and the eccentric rotor is rotatably connected to the shaft and has a triangular shape with curved sides, wherein the eccentric rotor orbitally revolves within the housing such that decompression of reject fluid on one side of the eccentric rotor assists in compression of mixed fluid on another side of the eccentric rotor.

BRIEF DESCRIPTION OF THE DRAWINGS

FIG. 5 is a table explaining the operation of the compressible fluid separator pump, in accordance with embodiments of the present disclosure.

FIG. 12 is a table explaining the operation of the alternative compressible fluid separator pump of FIG. 11, in accordance with embodiments of the present disclosure.

DETAILED DESCRIPTION

Figure 1:
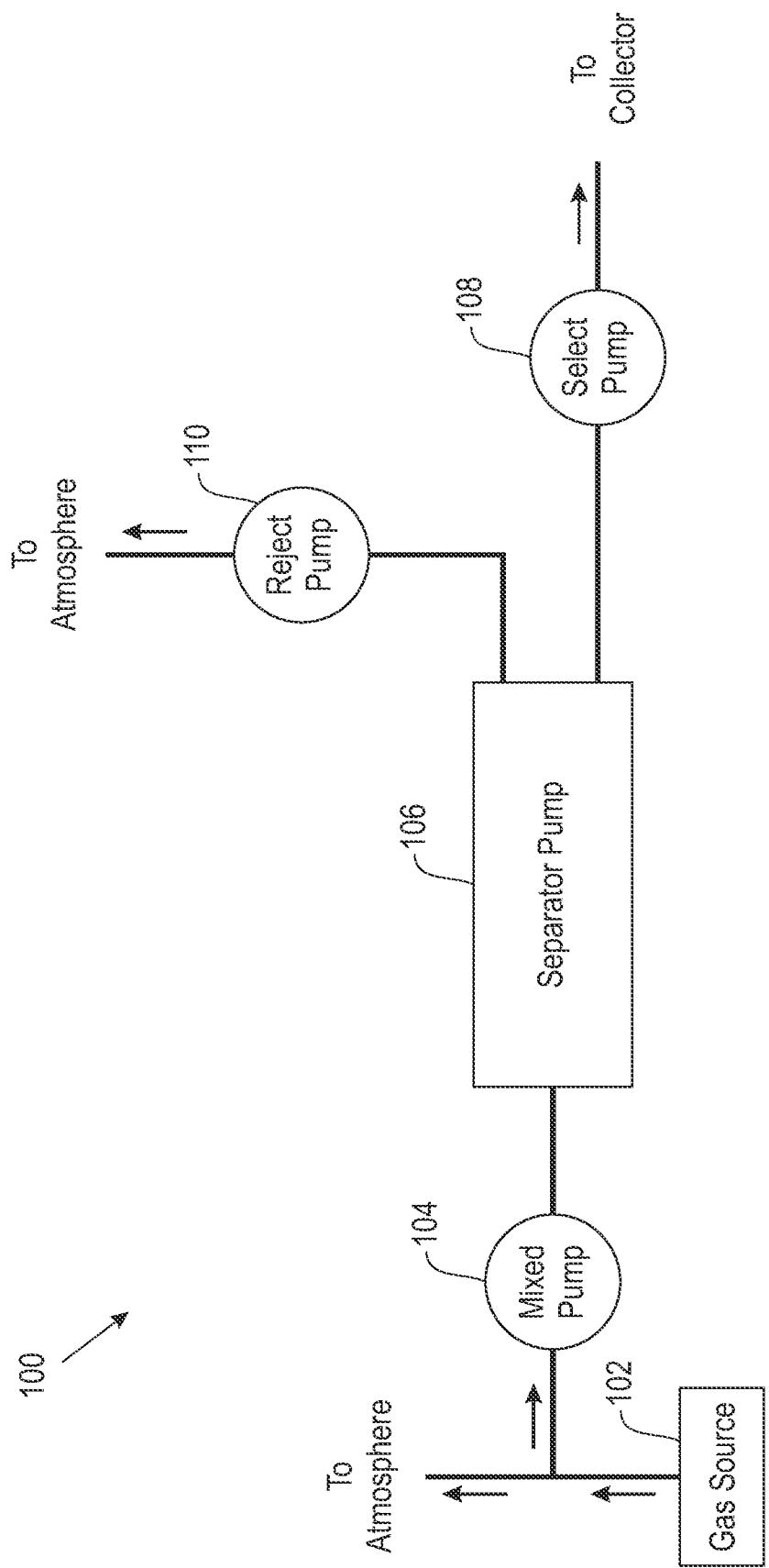
FIG. 1 is a schematic view of a compressible fluid separator system including a compressible fluid separator pump, in accordance with embodiments of the present disclosure.

Various embodiments of the present disclosure are described herein with reference to the related drawings. Alternative embodiments can be devised without departing from the scope of the present disclosure. It is noted that various connections and positional relationships (e.g., over, below, adjacent, etc.) are set forth between elements in the following description and in the drawings. These connections and/or positional relationships, unless specified otherwise, can be direct or indirect, and the present disclosure is not intended to be limiting in this respect. Accordingly, a coupling of entities can refer to either a direct or an indirect coupling, and a positional relationship between entities can be a direct or indirect positional relationship.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus. In addition, any numerical ranges included herein are inclusive of their boundaries unless explicitly stated otherwise.

For purposes of the description hereinafter, the terms "upper," "lower," "right," "left," "vertical," "horizontal," "top," "bottom," and derivatives thereof shall relate to the described structures and methods, as oriented in the drawing Figures. The terms "overlying," "atop," "on top," "positioned on" or "positioned atop" mean that a first element, such as a first structure, is present on a second element, such as a second structure, wherein intervening elements such as an interface structure can be present between the first element and the second element. The term "direct contact" means that a first element, such as a first structure, and a second element, such as a second structure, are connected without any intermediary components at the interface of the two elements.

FIG. 1 is a schematic view of compressible fluid separator system 100 ("system 100"), which includes gas source 102, mixed pump 104, compressible fluid separator pump 106 ("separator 106"), select pump 108, and reject pump 110. In some embodiments, gas source 102 is a combustion system of some type, such as, for example, an electric power plant. In such embodiments, the composition of the mixed flue gas emanating therefrom can essentially be, for example, 5-15% carbon dioxide ($CO_2$) and 95-85% nitrogen ($N_2$) (and there may be some other trace gasses present). In some situations, it can be beneficial to separate the mixed gas into a target component and a discharge component in order to collect the target component. In other embodiments, gas source 102 is absent, and mixed pump 104 draws air (which is a mixed gas) in from the atmosphere. In such embodiments, the concentration of carbon dioxide is 0.04%. In other embodiments, system 100 acts on a different compressible mixed fluid.

In the illustrated embodiment, mixed pump 104 draws some or all of the exhaust from gas source 102. The mixed gas then enters separator 106 where it is separated into select gas and reject gas. Separator 106 functions to filter the mixed gas such that the concentration of the target component is higher in the select gas than in the mixed gas and in the reject gas, and the concentration of the discharge component is lower in the select gas than in the mixed gas and in the reject gas. Conversely, the concentration of the discharge component is higher in the reject gas than in the mixed gas and in the select gas, and the concentration of the target component is lower in the reject gas than in the mixed gas and in the select gas. In some embodiments, the target component is carbon dioxide and the discharge component is nitrogen, so the select gas has an increased concentration of carbon dioxide than the mixed gas does. The select gas exits separator 106 separately from the reject gas, although the select gas may not solely be carbon dioxide. Instead, it may include some of the discharge component (e.g., nitrogen). Similarly, the reject gas may include some of the target component (e.g., carbon dioxide) despite carbon dioxide being the target for selection.

In the illustrated embodiment, the select gas can be pumped by select pump 108 for collection (e.g., compression into a supercritical fluid and transported off-site). The reject gas can be pumped by reject pump 110 to exit system 100 (e.g., vented to atmosphere). Thereby, system 100 can separate a low concentration or trace gas from common gasses. While system 100 includes pumps 104, 108, and 110, system 100 (or some portions thereof) can operate at ambient pressures. In such embodiments, pumps 104, 108, and/or 110 are optional or absent.

Figure 2:
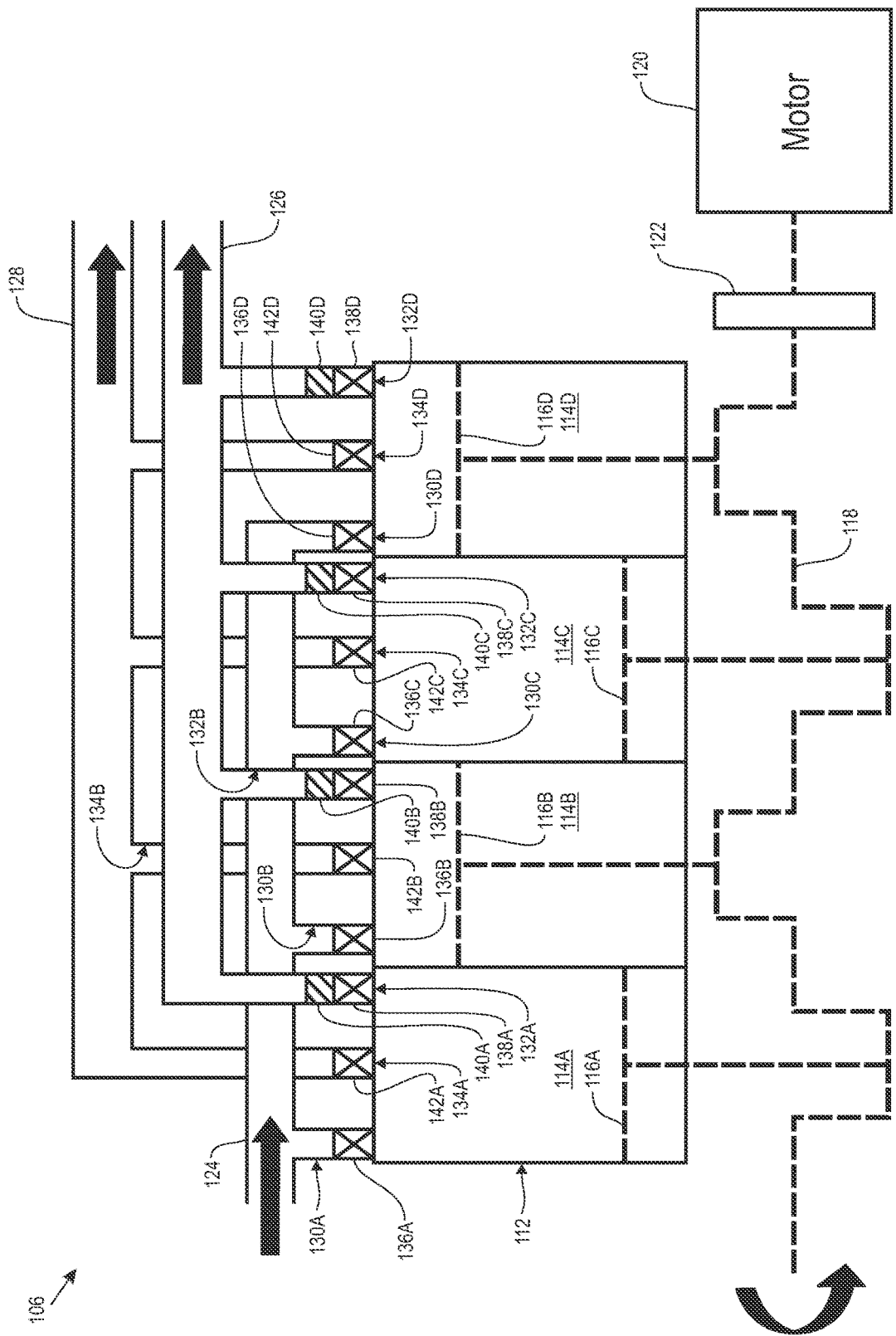
FIG. 2 is a schematic cross-section view of the compressible fluid separator pump, in accordance with embodiments of the present disclosure.
Figure 3:
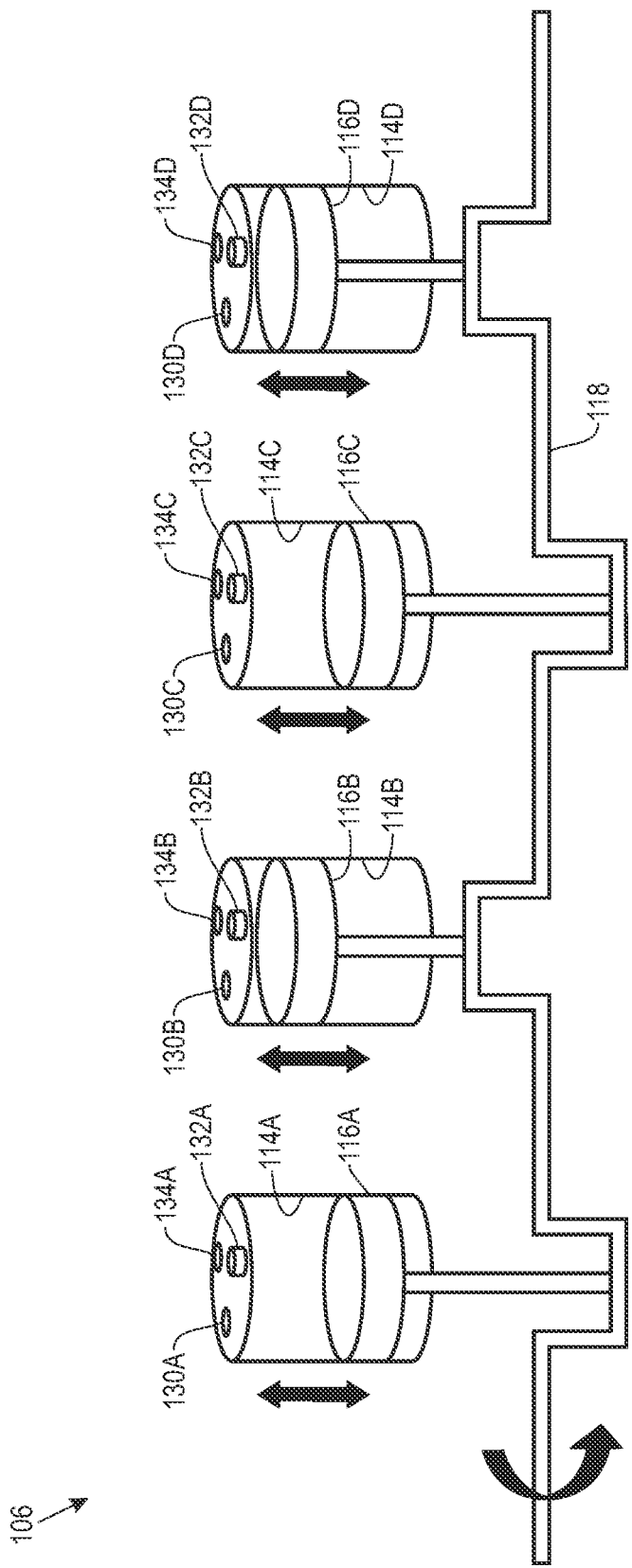
FIG. 3 is a transparent perspective view of a portion of the compressible fluid separator pump, in accordance with embodiments of the present disclosure.

FIG. 2 is a schematic cross-section view of separator 106. FIG. 3 is a transparent perspective view of a portion of separator 106. FIGS. 2 and 3 will now be discussed in conjunction with each other. In general, separator 106 bears a resemblance to an inline four-stroke reciprocating internal combustion engine, although there are substantial differences between the two machines.

In the illustrated embodiment, separator 106 includes block 112 (having cylinders 114A-114D, collectively "cylinders 114"), pistons 116A-116D (collectively "pistons 116"), crankshaft 118, motor 120, flywheel 122, inlet manifold 124, select manifold 126, and reject manifold 128. Cylinders 114A-114D include inlets 130A-130D (collectively "inlet 130"), select outlets 132A-132D (collectively "select outlets 132"), and reject outlets 134A-134D (collectively "reject outlets 134"), respectively. Inlets 130A-130D include inlet valves 136A-136D (collectively "inlet valves 136"), select outlets 132A-132D include select valves 138A-138D (collectively "select valves 138") and separator members 140A-140D (collectively "separator members 140"), and reject outlets 134A-134D include reject valves 142A-142D (collectively "reject valves 142"), respectively.

In the illustrated embodiment, each piston 116 is slidably positioned in its corresponding cylinder 114 and can move between bottom dead center (à la piston 116A) and top dead center (à la piston 116B). The movement of pistons 116 is provided by crankshaft 118, to which each piston 116 is rotatably connected. More specifically, crankshaft 118 has a series of eccentric sections on which pistons 116 ride, respectively, such that the rotation of crankshaft 118 can be converted into linear, reciprocating translation of pistons 116. Two of these eccentric sections are in the same radial position on crankshaft 118, and the other two are opposite thereof (i.e., one-hundred-eighty degrees apart). Crankshaft 118 is also connected to motor 120 (which is, for example, an electric motor or combustion engine) and flywheel 122. The rotation of crankshaft 118 can be powered in part by motor 120, and flywheel 122 increases the rotational inertia of crankshaft 118 to smooth its rotation throughout the operation of separator 106.

In the illustrated embodiment, the top of each cylinder 114 includes an inlet 130, a select outlet 132, and a reject outlet 134. Each inlet 130 is fluidly connected to inlet manifold 124, each select outlet 132 is fluidly connected to select manifold 126, and each reject outlet 134 is fluidly connected to reject manifold 128. In some embodiments, inlet manifold 124 is fluidly connected to mixed pump 104 (shown in FIG. 1), select manifold 126 is fluidly connected to select pump 108 (shown in FIG. 1), and/or reject manifold 128 is fluidly connected to reject pump 110 (shown in FIG. 1).

In the illustrated embodiment, valves 136, 138, 142 control gas flow from inlet manifold 124, through cylinders 114, and to manifolds 126, 128. Valves 136, 138, and 142 can be controlled, for example, electronically by actuators with sensors (not shown) or mechanically by a camshaft (not shown), although in some embodiments, select valves 138 are check valves that are not controlled by another system. In addition, separator members 140 are positioned between cylinders 114 and select manifold 126. Separator members 140 control the type of fluid that enters manifold 126. More specifically, separator members 140 can be polymer or graphene selective membranes that prefer certain component materials (e.g., atoms or molecules) over others. In this context, if separator members 140 prefer a component, then that component more easily passes through separator members 140 than other components and/or the other components have more difficulty passing through separator members 140 than the preferred component does. For example, separator members 140 can be configured to selectively prefer carbon dioxide over nitrogen if carbon dioxide is the target component and nitrogen is the discharge component. Such separator members 140 may still allow some nitrogen through, though, but the select gas on the downstream side of separator members 140 will have a higher concentration of carbon dioxide and a lower concentration of nitrogen than the mixed gas on the upstream side. The extent to which a target component may be preferred (and therein allowed through the separator member at a high rate) while the discharge component is dispreferred (and therein not allowed through separator members 140 at the same rate) may be application specific, such that a satisfactory level of preference in one application may be unsatisfactory in another application.

Figure 4:
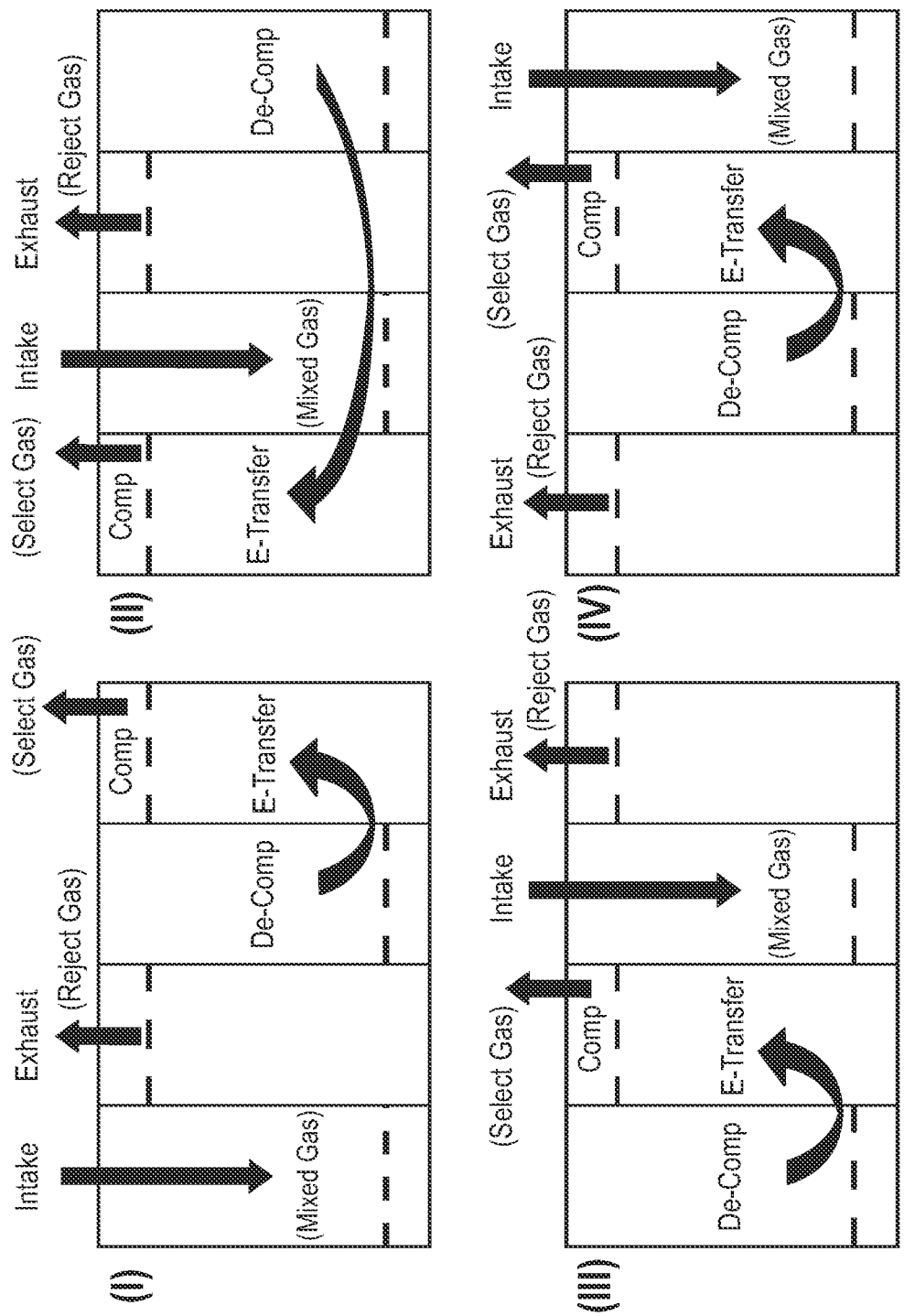
FIG. 4 is a series of schematic views of the operation of the compressible fluid separator pump, in accordance with embodiments of the present disclosure.

FIG. 4 is a series of schematic views of the operation of separator 106. Because separator 106 operates on a four-stroke cycle, FIG. 4 includes four views I-IV. FIG. 5 is a table explaining the operation of separator 106. Because separator 106 operates on a four-stroke cycle, FIG. 5 includes four rows I-IV. FIGS. 4 and 5 will now be discussed in conjunction with each other.

In general, the four-stroke cycle that each cylinder 114/piston 116 pair completes (and repeats) is composed of the following operations: I) intake, II) compression, III) decompression, and IV) exhaust. At a given time, each of pistons 116 are completing a different operation. While the intake and exhaust operations do not require much energy to complete (i.e., the input from motor 120, shown in FIG. 2, merely needs to overcome friction and the gas flow losses), the compression operation requires a substantial amount of energy input. However, every compression operation occurs simultaneously with a decompression operation in a different cylinder 114/piston 116 pair, and the energy made available during the decompression operation can be transferred to the compressing cylinder 114/piston 116 via crankshaft 118. This provides a significant portion of the energy input for the compression operation, which reduces the energy input from motor 120.

In the illustrated embodiment of view I, piston 116A is moving toward bottom dead center (BDC), which draws mixed gas from inlet manifold 124 (shown in FIG. 2) into cylinder 114A. Thus, row I shows that inlet valve 136A is opened and valves 138A and 142A are closed. Piston 116B is moving toward top dead center (TDC), which expels reject gas from cylinder 114B into reject manifold 128 (shown in FIG. 2). Thus, row I shows that reject valve 142B is opened and valves 136B and 138B are closed. Piston 116C is moving toward BDC during decompression of cylinder 114C to assist with the compression being done by piston 116D in cylinder 114D. Thus, row I shows that valves 136C and 138C are closed. However, reject valve 142C is denoted as being closed and opened because reject valve 142C is initially closed and is opened towards the end of the stroke to prevent vacuum pressure from occurring in cylinder 114C. Piston 116D is moving toward TDC during compression of cylinder 114D to increase the pressure differential across separator member 140D. This provided force urges the target component to move through the selective membrane into select manifold 126 (shown in FIG. 2). Thus, row I shows that select valve 138D is opened and valves 136D and 142D are closed.

In the illustrated embodiment of view II, piston 116B is moving toward BDC, which draws mixed gas from inlet manifold 124 into cylinder 114B. Thus, row II shows that inlet valve 136B is opened and valves 138B and 142B are closed. Piston 116C is moving toward TDC, which expels reject gas from cylinder 114C into reject manifold 128. Thus, row II shows that reject valve 142C is opened and valves 136C and 138C are closed. Piston 116D is moving toward BDC during decompression of cylinder 114D to assist with the compression being done by piston 116A in cylinder 114A. Thus, row II shows that valves 136D and 138D are closed. However, reject valve 142D is denoted as being closed and opened because reject valve 142D is initially closed and is opened towards the end of the stroke to prevent vacuum pressure from occurring in cylinder 114D. Piston 116A is moving toward TDC during compression of cylinder 114A to increase the pressure differential across separator member 140A. This provided force urges the target component to move through the selective membrane into select manifold 126. Thus, row II shows that select valve 138A is opened and valves 136A and 142A are closed.

In the illustrated embodiment of view III, piston 116C is moving toward BDC, which draws mixed gas from inlet manifold 124 into cylinder 114C. Thus, row III shows that inlet valve 136C is opened and valves 138C and 142C are closed. Piston 116D is moving toward TDC, which expels reject gas from cylinder 114D into reject manifold 128. Thus, row III shows that reject valve 142D is opened and valves 136D and 138D are closed. Piston 116A is moving toward BDC during decompression of cylinder 114A to assist with the compression being done by piston 116B in cylinder 114B. Thus, row III shows that valves 136A and 138A are closed. However, reject valve 142A is denoted as being closed and opened because reject valve 142A is initially closed and is opened towards the end of the stroke to prevent vacuum pressure from occurring in cylinder 114A. Piston 116B is moving toward TDC during compression of cylinder 114B to increase the pressure differential across separator member 140B. This provided force urges the target component to move through the selective membrane into select manifold 126. Thus, row III shows that select valve 138B is opened and valves 136B and 142B are closed.

In the illustrated embodiment of view IV, piston 116D is moving toward BDC, which draws mixed gas from inlet manifold 124 into cylinder 114D. Thus, row IV shows that inlet valve 136D is opened and valves 138D and 142D are closed. Piston 116A is moving toward TDC, which expels reject gas from cylinder 114A into reject manifold 128. Thus, row IV shows that reject valve 142A is opened and valves 136A and 138A are closed. Piston 116B is moving toward BDC during decompression of cylinder 114B to assist with the compression being done by piston 116C in cylinder 114C. Thus, row IV shows that valves 136B and 138B are closed. However, reject valve 142B is denoted as being closed and opened because reject valve 142B is initially closed and is opened towards the end of the stroke to prevent vacuum pressure from occurring in cylinder 114B. Piston 116C is moving toward TDC during compression of cylinder 114C to increase the pressure differential across separator member 140C. This provided force urges the target component to move through the selective membrane into select manifold 126. Thus, row IV shows that select valve 138C is opened and valves 136C and 142C are closed.

In the illustrated embodiment, the partial pressure of the target component in the mixed gas needs to be higher than the partial pressure of the target component in the select gas in order for the target component to pass through separator members 140. In some embodiments, the greater the difference in the partial pressures in the mixed gas and the select gas, the greater the motive force is for the target component to pass through separator members 140. Separator 106 can be compared to a system (not shown) that only uses a vacuum on the select gas without compressing the mixed gas. Such a system could only have a pressure differential of one atmosphere (at most), so the compression operation of separator 106 will remove more of the target component from the mixed gas in a given time period. Alternatively, separator 106 could remove the same amount of target component from the mixed gas while being smaller than the solely vacuum-based system. This is because, in some embodiments, the peak pressure during the compression operation can be fifty times larger than the pressure of the mixed gas in inlet manifold 124 (i.e., the cylinder 114/piston 116 compression ratio is 50:1). Thus, separator 106 can be fifty times faster or fifty times smaller than a solely vacuum-based system. Alternatively, a balance can be struck between solely favoring speed or solely favoring size. Furthermore, the speed of operation of separator 106 can be adjusted by motor 120 based on, for example, the permeability of separator members 140 and/or the flow rate of gas coming into inlet manifold 124 (e.g., due to changes in the operating conditions of gas source 102, shown in FIG. 1). For example, the speed of motor 120 can be chosen to optimize the average rate that the target component migrates through separator members 140. In such embodiments, if the permeance of separator members 140 is low, then increasing the time that the mixed gas is compressed can be beneficial. Therefore, a lower speed for motor 120 can be utilized. In some embodiments, motor 120 can be a type of motor other than a constant rate motor, such as, for example, a stepper motor. In such embodiments, pistons 116 can be rapidly moved between at TDC and BDC and stopped at TDC and BDC, respectively. Holding the piston 116 performing the compression operation in the TDC position for a longer period of time allows for more target component migration across separator members 140 to occur.

As stated previously, the compression operation in one cylinder 114 is aided by the simultaneous decompression operation in another cylinder 114. Because separator 106 is a positive displacement machine, the recovery of energy stored in a compressed cylinder 114 via decompression is simpler and more efficient compared to a system (not shown) that uses viscosity-based turbines for energy recovery. However, some input from motor 120 is needed during the operation of separator 106. Besides friction and viscosity losses due to the moving parts and fluids, the decompression energy does not equal the compression energy. This is because some of the mixed gas (i.e., the select gas) escapes cylinder 114 through separator member 140 during compression. Therefore, the amount of remaining mixed gas (i.e., the reject fluid) for decompression is smaller in volume than the mixed gas being compressed in another cylinder 114. Motor 120 can input the energy required to bridge the difference between the compression operations and the decompression operations. In addition, the opening of reject valve 142 prior to piston 116 reaching BDC can account for the loss in pressure due to the absent select gas. This avoids a situation where the decompressing cylinder 114 has a lower than ambient pressure at BDC, which would otherwise require more energy input from motor 120.

The four cylinder, four-stroke configuration of separator 106 allows for the energy that is expended in compressing the reject gas to be recovered and used for compressing more mixed gas. This energy would otherwise be wasted, for example, in a system (not shown) having only one cylinder/piston. Thereby, separator 106 can operate efficiently, even if the concentration of the target component is very low (e.g., when extracting carbon dioxide from air).

FIGS. 4 and 5 show one embodiment of the present disclosure, to which there are alternatives. For example, crankshaft 118 can have a different configuration wherein two adjacent eccentric sections have the same orientation. In such embodiments, two adjacent pistons 116 would be moving together. For another example, adjacent cylinders 114/pistons 116 can be at non-adjacent operations. In such embodiments, for example, cylinder 114A/piston 116A can be performing intake while cylinder 114C/piston 116C is performing exhaust.

Figure 6:
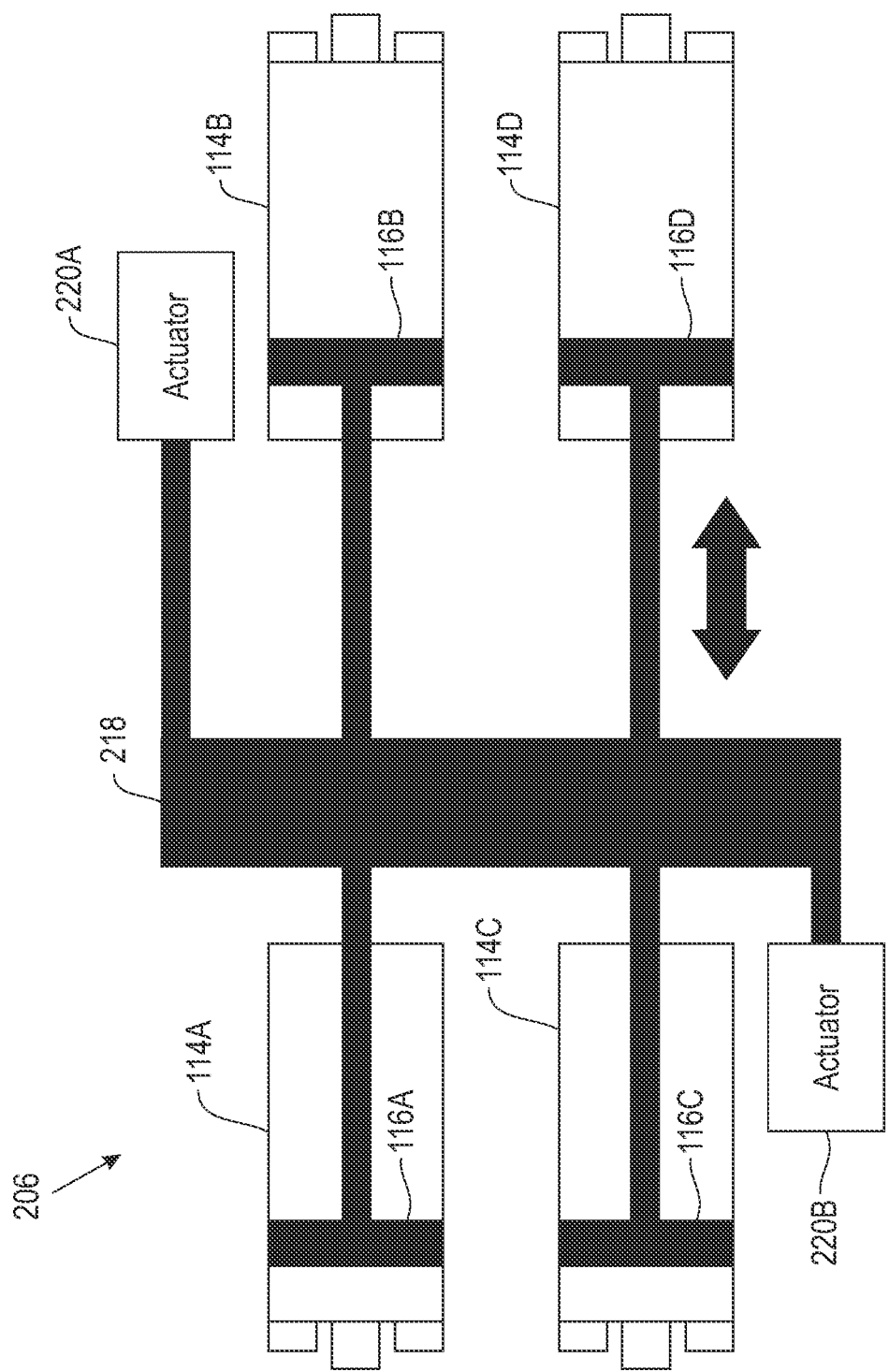
FIG. 6 is a schematic cross-section view of an alternative compressible fluid separator pump, in accordance with embodiments of the present disclosure.

FIG. 6 is a schematic cross-section view of alternative compressible fluid separator pump 206 ("separator 206"). Some of the components and features of separator 206 can be similar to or correspond with those of separator 106 (shown in FIGS. 2-5), and reference numerals that are one hundred greater may be used to indicate as much. In the illustrated embodiment, cylinders 114 and pistons 116 are arranged in an H pattern (as opposed to being inline as in separator 106). Pistons 116 are connected to bar 218, which translates left and right (towards and away from cylinders 114). Bar 218 is connected to two linear actuators 220A and 220B (collectively "actuators 220") at opposite ends. Actuators 220 provide the input energy that is lost due to friction and the collection of the select gas.

In the illustrated embodiment, separator 206 operates substantially the same as separator 106. Thereby, separator is able to transfer energy from a decompressing cylinder 114 to a compressing cylinder 114, which conserves the energy spent in compressing the reject gas.

Figure 7:
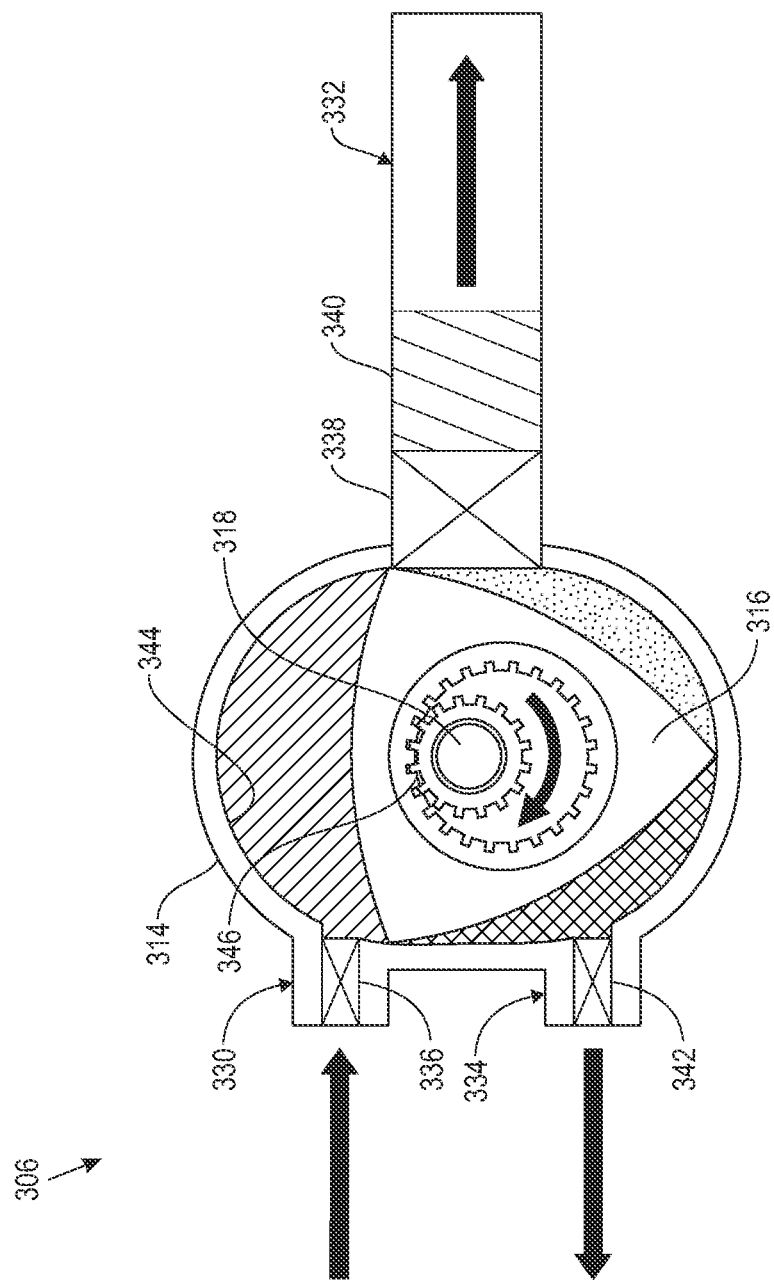
FIG. 7 is a schematic cross-section view of an alternative compressible fluid separator pump, in accordance with embodiments of the present disclosure.

FIG. 7 is a schematic cross-section view of alternative compressible fluid separator pump 306 ("separator 306"). Some of the components and features of separator 306 can be similar to or correspond with those of separator 106 (shown in FIGS. 2-5), and reference numerals that are two hundred greater may be used to indicate as much. In the illustrated embodiment, separator 306 has a Wankel-type configuration. Separator 306 includes housing 314, eccentric rotor 316, and driveshaft 318. Housing 314 includes hollow cavity 344 and inlet 330, select outlet 332, reject outlet 334 which are fluidly connected to hollow cavity 344. Inlet 330 includes inlet valve 336, select outlet 332 includes select valve 338 and separator member 340, and reject outlet includes reject valve 342.

In the illustrated embodiment, rotor 316 has a triangular shape with curved sides and is slidably positioned in hollow cavity 344. Rotor 316 is rotatably connected to driveshaft 318 via gear set 346, and rotor 316 is eccentric to driveshaft 318. Therefore, rotor 316 rotates and orbitally revolves in housing 314. As this occurs, each side of rotor 316 will draw in mixed gas, compress it against select outlet 332 (forcing the select gas through select outlet 332), and expel the reject gas through reject outlet 334.

In the illustrated embodiment, each of the three sides of rotor 316 is performing a different operation in the cycle of intake, compression, decompression, and exhaust at a given time. Therefore, the decompression on one side can provide energy for the compression on another side. In addition, a motor (not shown) can be connected to driveshaft 318 to make up the energy lost during each cycle. In some embodiments, there are additional housings 314 and rotors 316 stacked on the same driveshaft 318. In such embodiments, rotors 316 can be offset by a measure of degrees that corresponds to the number of housings 314/rotors 316 there are. For example, if there are three housings 314/rotors 316, then each rotor 316 can be one-hundred-twenty degrees from each other.

Figure 8:
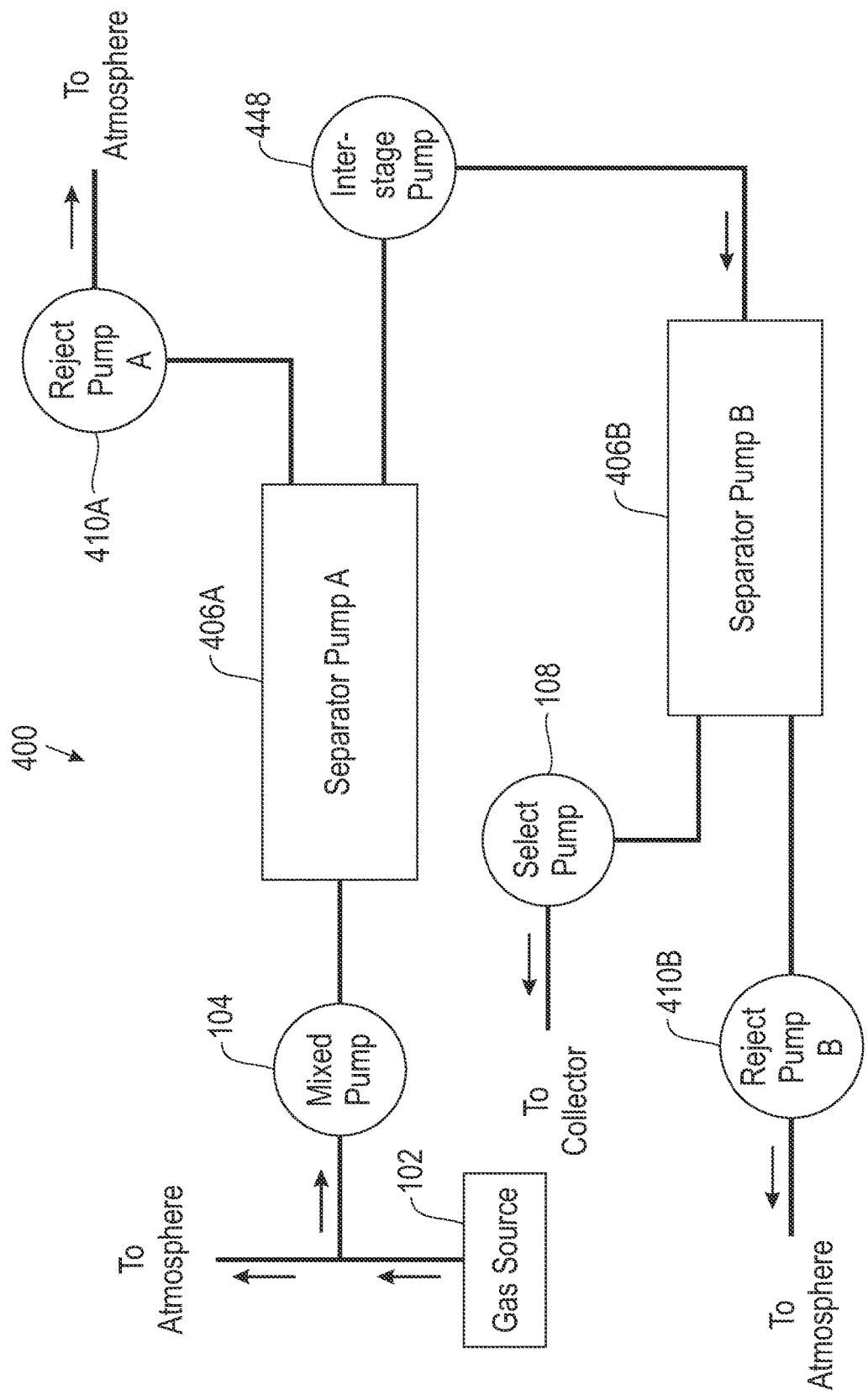
FIG. 8 is a schematic view of a two-stage compressible fluid separator system including two serial compressible fluid separator pumps, in accordance with embodiments of the present disclosure.

FIG. 8 is a schematic view of a two-stage compressible fluid separator system 400 ("system 400") including two serial compressible fluid separator pumps 406A and 406B (collectively "separators 406"). Some of the components and features of system 400 and separators 406 can be similar to or correspond with those of system 100 and separator 106 (shown in FIGS. 1-5), and reference numerals that are three hundred greater may be used to indicate as much.

In the illustrated embodiment, system 400 includes gas source 102, mixed pump 104, separators 406, select pump 108, reject pumps 410A and 410B (collectively "reject pumps 410"), and interstage pump 448. The select gas from separator 406A is routed to separator 406B, which further refines the select gas so it has an even higher concentration of the target component. This can be especially useful for low-selectivity membranes (i.e., membranes that let a substantial amount of discharge component through into the select gas). For example, a membrane can have a selectivity of 11, and if the mixed gas is 90% nitrogen and 10% carbon dioxide, then the select gas at interstage pump 448 would be 45% nitrogen and 55% carbon dioxide. This is because the governing equation is $S=((1-C_M)/C_M)*(C_S/(1-C_S))$, wherein "S" is the selectivity, "$C_M$" is the incoming concentration of the target component in the mixed gas, and "$C_S$" is the outgoing concentration of the target component in the select gas. In such an embodiment, the select gas at select pump 108 would be 6.9% nitrogen and 93.1% carbon dioxide because the concentration occurred twice.

After the second enrichment, the select gas can be pumped by select pump 108 for collection (e.g., compression into a supercritical fluid and transported off-site). The reject gas can be pumped by reject pumps 410 to exit system 400 (e.g., vented to atmosphere). Thereby, system 400 can separate a low concentration or trace gas from common gasses. While system 400 includes pumps 104, 108, 410, and 448, system 400 (or some portions thereof) can operate at ambient pressures. In such embodiments, pumps 104, 108, 410, and/or 448 are optional or absent.

Figure 9:
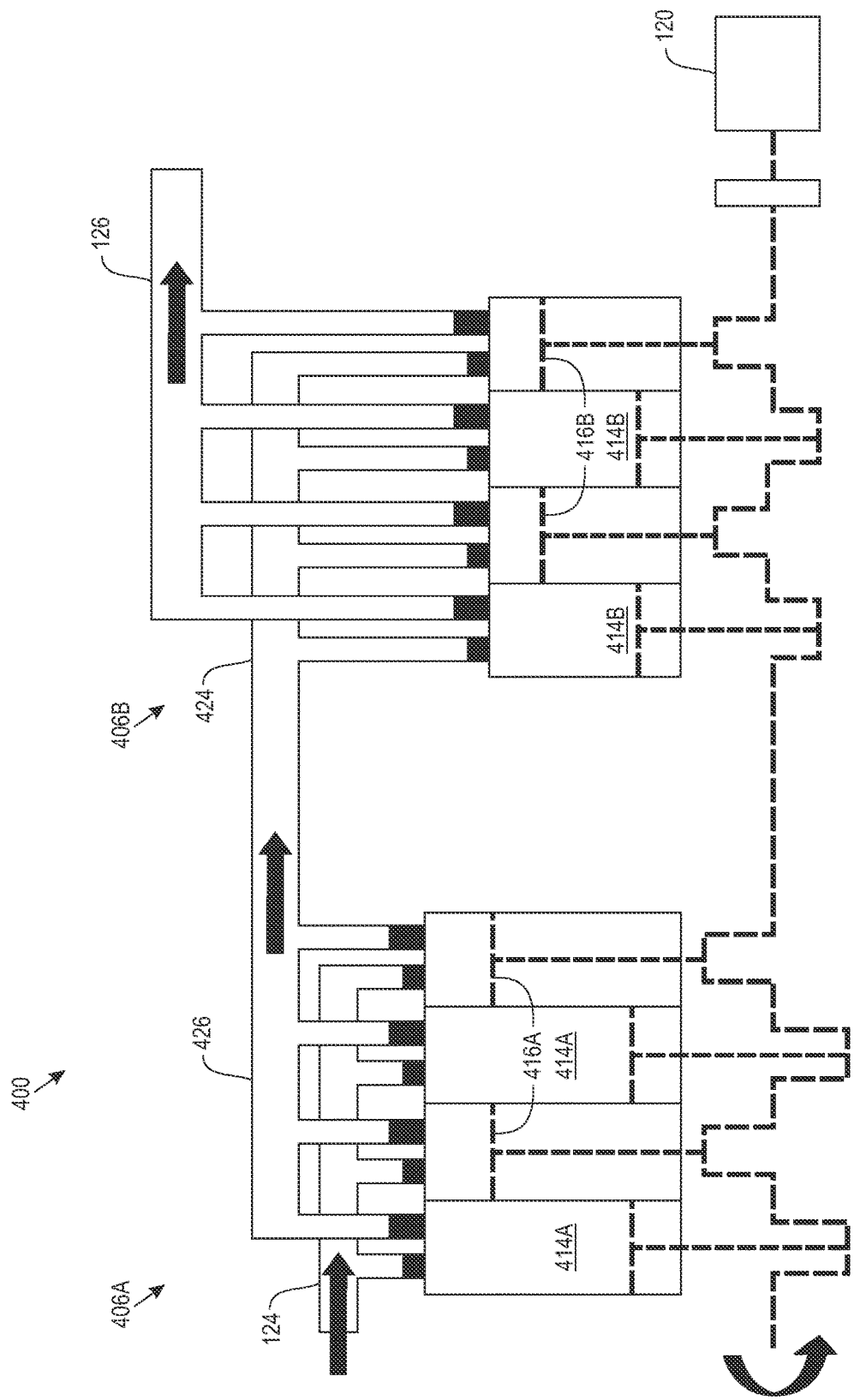
FIG. 9 is a schematic cross-section view of a two-stage compressible fluid separator system including two serial compressible fluid separator pumps, in accordance with embodiments of the present disclosure.

FIG. 9 is a schematic cross-section view of a portion of system 400 including two serial separators 406. Some of the components and features of system 400 and separators 406A and 406B can be similar to or correspond with those of system 100 and separator 106 (shown in FIGS. 1-5), and reference numerals that are three hundred greater may be used to indicate as much.

In the illustrated embodiment, the reject outlets and reject manifolds for separators 406A and 406B have been omitted for clarity. In addition, interstage pump 448 is not present in this embodiment. Instead, select manifold 426 of separator 406A is directly fluidly connected to inlet manifold 424 of separator 406B. Then, the select gas being collected is from select manifold 126 of separator 406B. Thus, the mixed gas entering inlet manifold 124 of separator 406A is doubly separated by the time it exits system 400.

In the illustrated embodiment, pistons 416A of separator 406A and piston 416B of separator 406B are connected to a single crankshaft 418. Therefore, separators 406 are synchronized with each other and there is only one motor 120, although in some embodiments, there are separate crankshafts and motors. In addition, the displacement of separator 406B is substantially smaller than separator 406A. This can be accomplished, for example, using smaller cylinders 414B and/or shorter-stroke pistons 416B.

This difference in size between separators 406 is because of the stage cut associated with the volume of select gas coming into separator 406B only being a fraction of the volume of mixed gas coming into separator 406A. In some embodiments, if the interstage select gas is only 15% of the volume of the initial mixed gas, then cylinders 414 may only be 15% of those in separator 406A, assuming that the pressures in inlet manifolds 124 and 424 are the same. In some embodiments, these pressures may be different. For example, if a mixed gas is 8% carbon dioxide pressurized to 506 kilopascals (kPa) (5 atmospheres (atm)) and the compression ratio in separator 406A is 10:1, then the pressure of the select gas in select manifold 426 will be 405 kPa (4 atm) (assuming perfect selectivity such that the select gas is substantially composed of the target component). This is because the partial pressure of carbon dioxide on the upstream side of the separator members will be the same on the downstream side.

In some embodiments, there are more than two stages of separators (e.g., four stages). In such embodiments, the incoming gas to the later-stage separators may be highly enriched with target component (e.g., 90% target component and 10% discharge component). In such situations, recovering the energy of compressing the reject gas may be significantly smaller than the energy expended in pushing the select gas through the separator member. Thus, such a system may use a separator member that prefers the target compound in the early stages, and then using a separator member that prefers the discharge component in the later stages. In such embodiments, the reject gas would be going through the separator member during the compression operation, and the select gas would be exiting the cylinder during the exhaust operation. This would allow for more energy to be transferred during decompression in the example given above wherein the incoming mixed gas is already 90% composed of target component. Such a switch in separator member preference could occur between the stages where the select gas has a concentration of target component of greater than 50%. In other words, the separator member could always be configured to prefer the less prevalent component/fluid.

Figure 10:
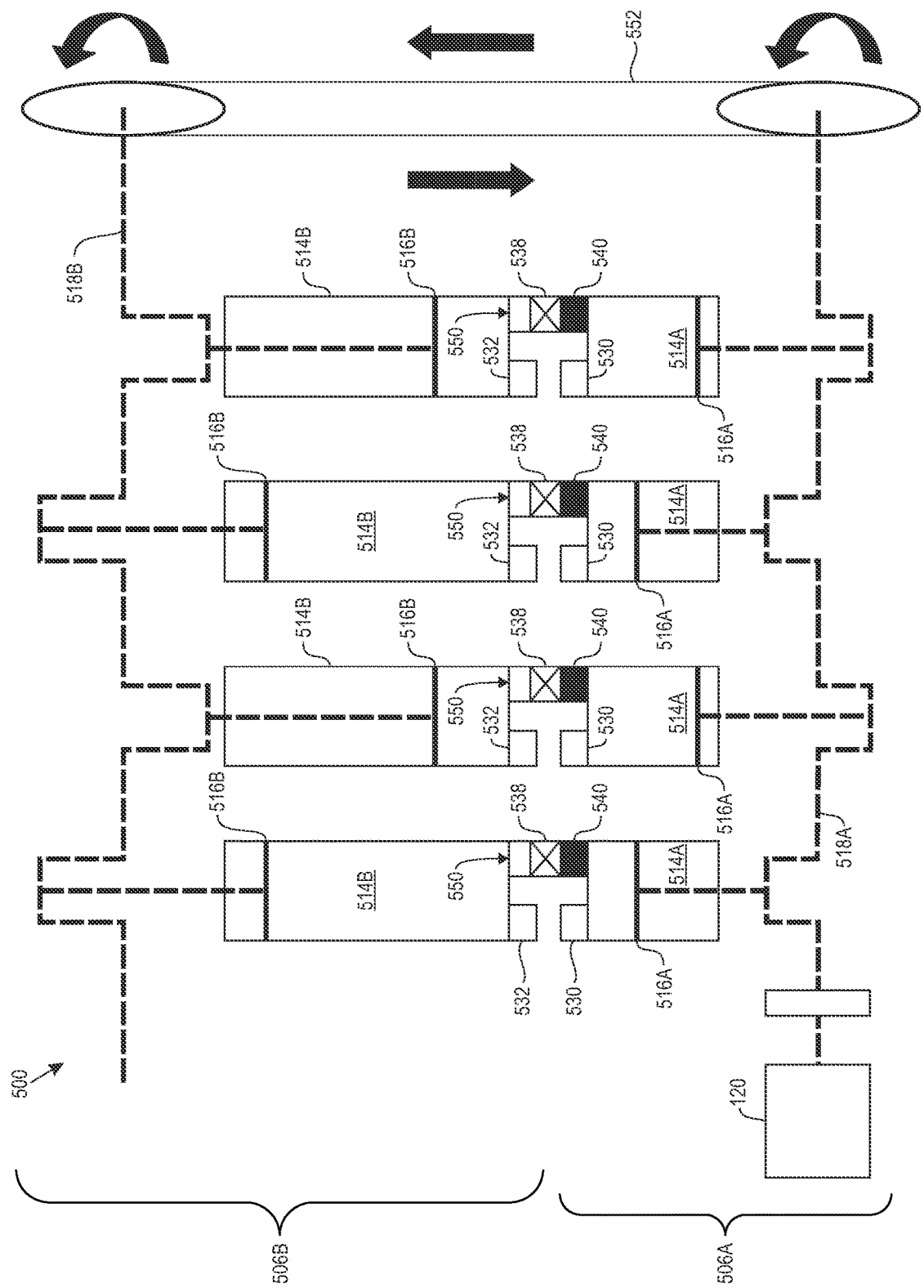
FIG. 10 is a schematic cross-section view of an alternative two-stage compressible fluid separator system including two serial compressible fluid separator pumps, in accordance with embodiments of the present disclosure.

FIG. 10 is a schematic cross-section view of a portion of alternative two-stage compressible fluid separator system 500 including two serial compressible fluid separator pumps 506A and 506B (collectively "separators 506"). Some of the components and features of system 500 and separators 506 can be similar to or correspond with those of systems 100 and/or 400 and/or separators 106, 206, 306, and/or 406 (shown in FIGS. 1-9), and reference numerals that are four or one hundred greater, respectively, may be used to indicate as much.

In the illustrated embodiment, the inlet manifold, reject outlets, and reject manifolds have been omitted for clarity, however, inlets 530 to each cylinder 514A and select outlets 532 from each cylinder 514B are shown. System 500 has two separators 506 in series, although each cylinder 514A is fluidly connected to only its corresponding cylinder 514B by one of couplers 550. Each coupler 550 includes a select valve 538 and a separator member 540. In addition, separator 506A is controlled by crankshaft 518A while separator 506B is controlled by crankshaft 518B. Crankshafts 518A and 518B (collectively "crankshafts 518") are both connected to timing mechanism 552 which can be comprised of, for example, two sprockets and a chain. Timing mechanism 552 synchronizes separators 506 such that when a cylinder 514A is compressing, its corresponding cylinder 514B is decompressing.

In the illustrated embodiment, the displacement of separator 506A is substantially smaller than the displacement of separator 506B. In some embodiments, the displacement of separator 506B can be ten times larger than that of separator 506A, which can be accomplished by, for example, wider cylinders 514B and/or longer travel of pistons 516B. Such a configuration can increase the rarefaction on the downstream side of separator members 540, increasing the motive force for select gas to pass therethrough.

The components and configuration of system 500 allows for separator 506A to put positive pressure on the upstream side of separator members 540 while separator 506B simultaneously pulls negative pressure on the downstream side of separator members 540. During this time, the corresponding select valve 538 will be opened such that the combination of upstream compression and downstream rarefaction are multiplicative. For example, if the compression ratio of pistons 516A are 100:1 and the compression ratio of pistons 514B are 1:100, then the pressure ratio generated by system 500 across separator members 540 is 10,000:1. Such a high ratio can be beneficial, for example, when separating carbon dioxide from air since its concentration is so low (0.04%). Thus, carbon dioxide only has a partial pressure of ½500 of the atmospheric pressure, but the ratio of 10,000:1 is four times larger that that. So system 500 could separate carbon dioxide from air while still allowing for the energy transfer from one decompressing cylinder 514A to another compressing cylinder 514A. Furthermore, there will be energy transfer from one compressing cylinder 514B (i.e., a derarifying cylinder 514B) to a decompressing cylinder 514B (i.e., a rarifying cylinder 514B). Thereby, the energy of compression and rarefaction is mostly conserved, and the remaining energy input can be provided by motor 120.

Figure 11:
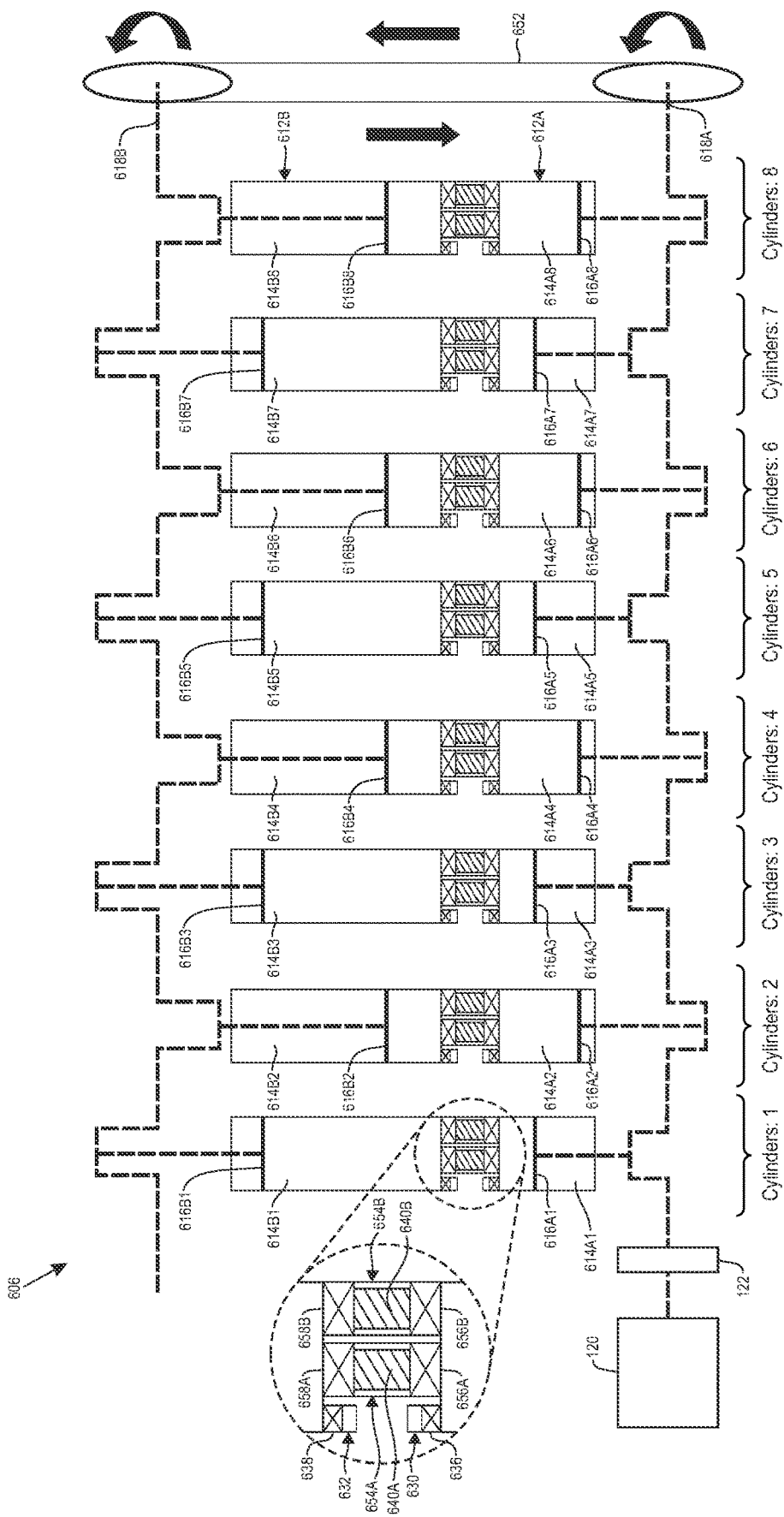
FIG. 11 is a schematic cross-section view of an alternative compressible fluid separator pump, in accordance with embodiments of the present disclosure.

FIG. 11 is a schematic cross-section view of alternative compressible fluid separator pump 606. Some of the components and features of separator 606 can be similar to or correspond with those of separators 106, 406, and/or 506 (shown in FIGS. 2-5, 9, and 10), and reference numerals that are five, two, or one hundred greater, respectively, may be used to indicate as much. In general, separator 606 has two banks of cylinders 614 with fluid locks 654 in between them, although, despite the resemblance to system 500, separator 606 is a single-stage device that operates on an eight-stroke cycle.

In the illustrated embodiment, separator 606 includes blocks 612A and 612B (collectively "blocks 612") (each having eight cylinders 614A1-614A8 (collectively "cylinders 614A") and 614B1-614B8 (collectively "cylinders 614A"), respectively), pistons 616, crankshafts 618A and 618B (collectively "crankshafts 618"), motor 120, flywheel 122, and locks 654. Separator 606 can also include an inlet manifold, a reject manifolds, and reject outlets on cylinders 614A (but not on cylinders 614B), although these components have been omitted for clarity. Cylinders 614A include inlets 630, respectively, and cylinders 614B include select outlets 632, respectively. Each corresponding pair of cylinders 614A and 614B (which can be identified by their shared final digit, e.g., "Cylinders 1" for the leftmost pair) are fluidly connected together by a lock 654A and a lock 654B (collectively "locks 654"). Lock 654A comprises entrance valve 656A, separator member 640A, and exit valve 658A. Similarly, lock 654B comprises entrance valve 656B, separator member 640B, and exit valve 658B. These features are shown in the inset depicting the center of cylinders 1, although it can be representative of the center of each of cylinders 2-8 as well.

In the illustrated embodiment, separator members 640 are solid or liquid sorbents that prefer the target component. Separator members 640 can comprise, for example, xeolite, a metal organic framework material, or choline-2-pyrrolidine carboxylic acid ([Cho][Pro]) combined with polyethylene glycol (PEG). Unlike a selective membrane, sorbents function by trapping the target component on or in themselves. That is why separator members 640 are positioned in locks 654—so that separator member 640 can be exposed to pressurized mixed gas (when piston 616A performs the compression operation) to sorb the target component. Then entrance valve 656 can be closed and exit valve 658 can be opened, allowing the target component to be released from separator member 640 into cylinder 614B (when piston 616B performs the decompression operation).

In the illustrated embodiment, valves 636, 638, 656, 658, and the reject valves (not shown) control gas flow into separator 606, through cylinders 1-8, and out of separator 606. Valves 636, 638, 656, 658, and the reject valves can be controlled, for example, electronically by actuators with sensors (not shown) or mechanically by a camshaft (not shown). While separator members 640 prefer the target component, some of the discharge component may still pass through locks 654 during operation of separator 606. This may be because some of the discharge component will sorb to separator members 640, although this may also be because there will be dead volumes in locks 654 that is not occupied by separator members 640. When exit valves 658 are opened for decompression, the mixed gas in the dead volumes will become part of the select gas. However, the select gas on the downstream side of separator members 640 will still have a higher concentration of target component (e.g., carbon dioxide) and a lower concentration of the discharge component (e.g., nitrogen) than the mixed gas on the upstream side.

FIG. 12 is a table explaining the operation of separator 606. Because separator 106 operates on a four-stroke cycle, FIG. 12 includes eight rows I-VIII. To correctly correlate FIG. 11 with FIG. 12, it should be recognized that FIG. 11 is shown at stroke II or VI. In addition, for compactness (since there are a substantial number of cells in the table), inlet valves 636 will be indicated using the reference character "J", entrance valves 656 will be indicated using the reference character "K", reject valves (not shown) in cylinders 614B will be indicated using the reference character "L", exit valves 658 will be indicated using the reference character "M", and select valves 638 will be indicated using the reference character "N". For example, entrance valves 656A will be referred to as "KA".

In general, the eight-stroke cycle that each cylinder 614A/piston 616A pair completes (and repeats) is composed of the following operations: I) intake, II) compression A or B, III) decompression, IV) exhaust, V) intake, VI) compression B or A, respectively, VII) decompression, and VIII) exhaust. At a given time, each of pistons 616A are completing a different operation. While the intake and exhaust operations do not require much energy to complete (i.e., the input from motor 120 merely needs to overcome friction and the gas flow losses), the compression operation requires a substantial amount of energy input. However, every compression operation occurs simultaneously with a decompression operation in a different cylinder 614A/piston 616A pair, and the energy made available during the decompression operation can be transferred to the compressing cylinder 614A/piston 616A via crankshaft 618A. This provides a significant portion of the energy input for the compression operation, which reduces the energy input from motor 120.

In the illustrated embodiment, crankshaft 618B is connected to crankshaft 618A and motor 120 by timing mechanism 652. Thus, the motions of pistons 616B are synchronized with pistons 616A such that pistons 616B are at BDC when pistons 616A are at TDC. Thus, the eight-stroke cycle that each cylinder 614B/piston 616B pair completes (and repeats) is composed of the following operations: I) exhaust, II) rarefaction B, III) de-rarefaction, IV) regurgitation, V) exhaust, VI) rarefaction A, VII) de-rarefaction, and VIII) regurgitation. At a given time, each of pistons 616B are completing a different operation. While the exhaust and regurgitation operations do not require much energy to complete (i.e., the input from motor 120 merely needs to overcome friction and the gas flow losses), the rarefaction operations (i.e., pulling negative pressure) require a substantial amount of energy input. However, every rarefaction operation occurs simultaneously with a de-rarefaction operation (i.e., returning to ambient pressure) in a different cylinder 614B/piston 616B pair, and the energy made available during the de-rarefaction operation can be transferred to the rarefying cylinder 614B/piston 616B via crankshaft 618B. This provides a significant portion of the energy input for the compression operation, which reduces the energy input from motor 120.

In the illustrated embodiment, the eight-stroke cycle is utilized because compression against a separation member 640 cannot occur simultaneously with rarefaction thereon, lest the mixed gas flow past and/or through separation member 640. Thus, only one side of each lock 654 is opened at a time, which causes cylinders 614B to undergo a regurgitation stroke since cylinders 614B only encounter select gas (and do not encounter any reject gas that would need to be expelled through the reject valves during the exhaust stroke, as with cylinders 614A). In some embodiments, only one lock 654 is present in cylinders 1-8, although in such an embodiment, there would be four dead strokes of each piston 614 per cycle, which would waste time and energy. Thus, separator 606 has two locks 654 for each cylinder 1-8.

In the illustrated embodiment, the displacement of block 612A is substantially smaller than the displacement of block 612B. In some embodiments, the displacement of block 612B can be ten times larger than that of block 612A, which can be accomplished by, for example, wider cylinders 614B and/or longer travel of pistons 616B. Such a configuration can increase the rarefaction on the downstream side of locks 654, increasing the motive force for the target compound to escape from separator members 640. This is because the partial pressure of the desorbed target compound is proportional to the partial pressure of the target compound when it was sorbed, and so the lower the ambient pressure is in cylinder 614B, the better. However, in some embodiments, block 612B (including cylinders 614B, pistons 616B, etc.) and crankshaft 618B are absent. In such embodiments, exit valves 658 release the select gas into a select manifold (not shown), and the select manifold would include a vacuum pump (a la select pump 108, shown in FIG. 1) to reduce the pressure in the select manifold down to approximately the minimum level that would occur in cylinders 614B during the rarefaction A/B operations (i.e., when the piston 616B is at BDC). While such embodiments may be less time and/or energy efficient, they would be simpler.

With reference to the table in FIG. 12, in the illustrated embodiment of stroke I, piston 616A1 is performing an intake operation. Piston 616A1 is moving toward BDC, which draws mixed gas into cylinder 614A1. Thus, row I shows that inlet valve 636/J is opened, and entrance valves 656/K and reject valve/L are closed. In addition, piston 616B1 is performing an exhaust operation, so it is moving toward TDC which forces select gas out of through select outlet 632. Thus, row I shows that select valve 638/N is opened, and exit valves 658/M are closed.

In the illustrated embodiment of stroke I, piston 616A2 is performing an exhaust operation. Piston 616A2 is moving toward TDC, which forces reject gas out of cylinder 614A2. Thus, row I shows that reject valve/L is opened, and inlet valve 636/J and entrance valves 656/K are closed. In addition, piston 616B2 is performing a regurgitation operation, so it is moving toward BDC which draws select gas back into cylinder 614B2. Thus, row I shows that select valve 638/N is opened, and exit valves 658/M are closed.

In the illustrated embodiment of stroke I, piston 616A3 is performing a decompression operation. Piston 616A3 is moving toward BDC, which assists with the compression being done by pistons 616A4 and 616A8. Thus, row I shows that valves 636/J, 656/K, and reject/L are closed. In addition, piston 616B3 is performing a de-rarefaction operation, so it is moving toward TDC which assists with the rarefaction being done by pistons 616B4 and 616B8. Thus, row I shows that valves 658/M and 638/N are closed.

In the illustrated embodiment of stroke I, piston 616A4 is performing a compression B operation. Piston 616A4 is moving toward TDC, which forces mixed gas into lock 654B. Thus, row I shows that entrance valve 656B/KB is opened, and valves 636/J, 656A/KA, and reject/L are closed. In addition, piston 616B4 is performing a rarefaction A operation, so it is moving toward BDC which pulls select gas out of lock 654A. Thus, row I shows that exit valve 658A/MA is opened, and exit valve 658B/MB and select valve 638/N are closed.

In the illustrated embodiment of stroke I, piston 616A5 is performing an intake operation. Piston 616A5 is moving toward BDC, which draws mixed gas into cylinder 614A5. Thus, row I shows that inlet valve 636/J is opened, and entrance valves 656/K and reject valve/L are closed. In addition, piston 616B5 is performing an exhaust operation, so it is moving toward TDC which forces select gas out of through select outlet 632. Thus, row I shows that select valve 638/N is opened, and exit valves 658/M are closed.

In the illustrated embodiment of stroke I, piston 616A6 is performing an exhaust operation. Piston 616A6 is moving toward TDC, which forces reject gas out of cylinder 614A6. Thus, row I shows that reject valve/L is opened, and inlet valve 636/J and entrance valves 656/K are closed. In addition, piston 616B6 is performing a regurgitation operation, so it is moving toward BDC which draws select gas back into cylinder 614B6. Thus, row I shows that select valve 638/N is opened, and exit valves 658/M are closed.

In the illustrated embodiment of stroke I, piston 616A7 is performing a decompression operation. Piston 616A7 is moving toward BDC, which assists with the compression being done by pistons 616A4 and 616A8. Thus, row I shows that valves 636/J, 656/K, and reject/L are closed. In addition, piston 616B7 is performing a de-rarefaction operation, so it is moving toward TDC which assists with the rarefaction being done by pistons 616B4 and 616B8. Thus, row I shows that valves 658/M and 638/N are closed.

In the illustrated embodiment of stroke I, piston 616A8 is performing a compression A operation. Piston 616A8 is moving toward TDC, which forces mixed gas into lock 654A. Thus, row I shows that entrance valve 656A/KA is opened, and valves 636/J, 656B/KB, and reject/L are closed. In addition, piston 616B8 is performing a rarefaction B operation, so it is moving toward BDC which pulls select gas out of lock 654B. Thus, row I shows that exit valve 658B/MB is opened, and exit valve 658A/MA and select valve 638/N are closed.

In the illustrated embodiment, the subsequent seven strokes of the eight-stroke cycle are completed as indicated by rows II-VIII of the table. After that, the cycle restarts again (as indicated by row I).

As stated previously, the compression operation in two of cylinders 614A is aided by the simultaneous decompression operation in two other cylinders 614A, and the rarefaction operation in two of cylinders 614B is aided by the simultaneous de-rarefaction operation in two other cylinders 614B. Because separator 606 is a positive displacement machine, the recovery of energy stored in a compressed cylinder 614A via decompression and the recovery of energy stored in a rarefied cylinder 614B via de-rarefaction is simpler and more efficient compared to a system (not shown) that uses viscosity-based turbines for energy recovery. However, some input from motor 120 is needed during the operation of separator 606. Besides friction and viscosity losses due to the moving parts and fluids, the decompression energy does not equal the compression energy nor does the de-rarefaction energy equal the rarefaction energy. The former is because some of the mixed gas (i.e., the select gas) is trapped in lock 654 (either by being sorbed by separator member 640 or trapped in the dead space) when entrance valve 656 closes after compression, so the amount of remaining mixed gas (i.e., the reject gas) for decompression is smaller in volume than the mixed gas being compressed in another cylinder 614A. The latter is because the most of the select gas from lock 654 desorbs/enters into cylinder 614B when exit valve 658 is opened, and the volume available for de-rarefaction is smaller since exit valve 658 is closed after rarefaction. Motor 120 can input the energy required to bridge the difference between the compression operations and the decompression operations and between the rarefication and de-rarefaction operations. While omitted from FIG. 12 for compactness, reject valve/L is opened prior to piston 616A reaching BDC during a decompression operation to account for the loss in pressure due to the absent select gas. This avoids a situation where the decompressing cylinder 114 has a lower than ambient pressure at BDC, which would otherwise require more energy input from motor 120. Similarly, select valve 638/N is opened prior to piston 616B reaching TDC during a de-rarefaction operation to account for the gain in pressure due to the additional select gas. This avoids a situation where the de-rarefying cylinder 614 has a higher than ambient pressure at BDC, which would otherwise require more energy input from motor 120.

The sixteen cylinder/eight cylinder pairs, eight-stroke configuration of separator 606 allows for the energy that is expended in compressing the reject gas to be recovered and used for compressing more mixed gas. It also allows for the energy that is expended in rarefying the select gas from one lock to be recovered and used for rarefying the select gas from another lock. Thereby, separator 106 can operate efficiently, even if the concentration of the target component is very low (e.g., when extracting carbon dioxide from air).

Further Discussion of Some Exemplary Embodiments

The following are non-exclusive descriptions of some exemplary embodiments of the present disclosure.

A compressible fluid separator pump, according to an exemplary embodiment of this disclosure, among other possible things, includes: a crankshaft; four cylinders, wherein each cylinder includes: an inlet including an inlet valve for mixed fluid comprising a target component and a discharge component; a reject outlet including a reject valve for a reject fluid; and a select outlet for a select fluid, wherein each of the select outlets includes a separator member that prefers the target component over the discharge component such that the target component is at a higher concentration in the select fluid than in the mixed fluid and in the reject fluid; and four pistons, wherein each piston: is connected to the crankshaft; and is positioned in one of the four cylinders; wherein the crankshaft is configured to position two of the pistons at top dead center when the other two of the pistons are at bottom dead center.

The compressible fluid separator pump of the preceding paragraph can optionally include, additionally and/or alternatively, any one or more of the following features, configurations, and/or additional components:

A further embodiment of the foregoing compressible fluid separator pump, wherein: the target component is carbon dioxide ($CO_2$); and the separator member is a membrane that prefers $CO_2$.

A further embodiment of any of the foregoing compressible fluid separator pumps, wherein the select outlet further comprises a select valve.

A two-stage compressible fluid separator system comprising: any of the foregoing compressible fluid separator pumps; and another compressible fluid separator pump configured in accordance with any of the foregoing compressible fluid separator pumps; wherein the select outlet for each cylinder of the compressible fluid separator pump is fluidly connected to an inlet for a corresponding cylinder of the another compressible fluid separator pump.

A further embodiment of any of the foregoing compressible fluid separator pumps, wherein each inlet is configured to be fluidly connected to an inlet manifold.

A further embodiment of any of the foregoing compressible fluid separator pumps, wherein the inlet manifold is configured to be fluidly connected to an exhaust of a combustion system.

A further embodiment of any of the foregoing compressible fluid separator pumps, wherein each select outlet is configured to be fluidly connected to a select manifold.

A further embodiment of any of the foregoing compressible fluid separator pumps, further comprising a motor connected to the crankshaft to assist in moving the pistons.

A further embodiment of any of the foregoing compressible fluid separator pumps, further comprising a flywheel connected to the crankshaft.

A method of operating a compressible fluid separator pump, according to an exemplary embodiment of this disclosure, among other possible things, includes: rotating a crankshaft connected to four pistons, wherein each piston is positioned in one of four cylinders, wherein each cylinder includes: an inlet including an inlet valve for mixed fluid comprising a target component and a discharge component; a reject outlet including a reject valve for the reject fluid; and a select outlet for the select fluid, wherein each of the select outlets includes a separator member that prefers the target component over the discharge component such that the target component is at a higher concentration in the select fluid than in the mixed fluid and in the reject fluid; opening an inlet valve to one cylinder of the four cylinders while its piston is moving towards bottom dead center to draw mixed fluid into the one cylinder; closing the inlet valve to the one cylinder; compressing mixed fluid against the separator member of the one cylinder while its piston is moving towards top dead center; and decompressing the one cylinder while its piston is moving towards bottom dead center to assist in the rotating of the crankshaft to compress mixed fluid against a separator member of another cylinder while its piston is moving towards top dead center.

The method of the preceding paragraph can optionally include, additionally and/or alternatively, any one or more of the following features, configurations, and/or additional components:

A further embodiment of the foregoing method, wherein: the target component is carbon dioxide ($CO_2$); the separator member is a membrane that prefers carbon dioxide; and compressing mixed fluid against the separator member results in carbon dioxide passing through the separator member.

A further embodiment of any of the foregoing methods, further comprising opening the reject valve to the one cylinder prior to its piston reaching bottom dead center during the decompressing to allow reject fluid to enter the one cylinder.

A further embodiment of any of the foregoing methods, further comprising opening the inlet valve to the one cylinder prior to its piston reaching bottom dead center during the decompressing to allow mixed fluid to enter the one cylinder.

A compressible fluid separator pump, according to an exemplary embodiment of this disclosure, among other possible things, includes: a first crankshaft; eight first cylinders, wherein each first cylinder includes: a first inlet including a first inlet valve for mixed fluid comprising a target component and a discharge component; a first select outlet with a first outlet valve for the select fluid, wherein each of the first select outlets includes a first separator member that prefers the target component over the discharge component such that the target component is at a higher concentration in the select fluid than in the mixed fluid and in the reject fluid; and a second select outlet with a second outlet valve for the select fluid, wherein each of the second select outlets includes a second separator member that prefers the target component over the discharge component such that the target component is at a higher concentration in the select fluid than in the mixed fluid and in the reject fluid; and eight first pistons, wherein each first piston: is connected to the first crankshaft; and is positioned in one of the eight first cylinders; wherein the first crankshaft is configured to position four of the first pistons at top dead center when the other four of the first pistons are at bottom dead center.

The compressible fluid separator pump of the preceding paragraph can optionally include, additionally and/or alternatively, any one or more of the following features, configurations, and/or additional components:

A further embodiment of the foregoing compressible fluid separator pump, further comprising: a second crankshaft; eight second cylinders, wherein each second cylinder includes: a second inlet including a second inlet valve for receiving select fluid from a corresponding first separator member; a third inlet including a third inlet valve for receiving select fluid from a corresponding second separator member; and a third select outlet including a third outlet valve for the select fluid; and eight second pistons, wherein each second piston: is connected to the second crankshaft; and is positioned in one of the eight second cylinders; wherein the second crankshaft is synchronized with the first crankshaft such that a first piston is at top dead center when a corresponding second piston is at bottom dead center.

A further embodiment of any of the foregoing compressible fluid separator pumps, wherein: the target component is carbon dioxide ($CO_2$); and the separator member is a sorbent material that prefers carbon dioxide.

A further embodiment of any of the foregoing compressible fluid separator pumps, wherein each of the first cylinders includes a reject outlet including a reject valve for the reject fluid.

A further embodiment of any of the foregoing compressible fluid separator pumps, wherein each inlet is fluidly connected to an exhaust of a combustion system.

A further embodiment of any of the foregoing compressible fluid separator pumps, further comprising a motor connected to the crankshaft to assist in moving the pistons.

A method of operating a compressible fluid separator pump, according to an exemplary embodiment of this disclosure, among other possible things, includes: rotating a first crankshaft connected to eight first pistons, wherein each first piston is positioned in one of eight first cylinders, wherein each first cylinder includes: a first inlet including a first inlet valve for mixed fluid comprising a target component and a discharge component; a first select outlet including a first outlet valve for the select fluid, wherein each of the first select outlets includes a first separator member that prefers the target component over the discharge component such that the target component is at a higher concentration in the select fluid than in the mixed fluid and in the reject fluid; and a second select outlet including a second outlet valve for the select fluid, wherein each of the second select outlets includes a second separator member that prefers the target component over the discharge component such that the target component is at a higher concentration in the select fluid than in the mixed fluid and in the reject fluid; opening a first inlet valve to one first cylinder while its piston is moving towards bottom dead center to draw mixed fluid into the one cylinder; closing the first inlet valve to the one first cylinder; opening the first select outlet valve; compressing mixed fluid against the separator member of the one first cylinder while its piston is moving towards top dead center; and decompressing the one first cylinder while its piston is moving towards bottom dead center to assist in the rotating of the first crankshaft to compress mixed fluid against a separator member of another first cylinder while its piston is moving towards top dead center.

The method of the preceding paragraph can optionally include, additionally and/or alternatively, any one or more of the following features, configurations, and/or additional components:

A further embodiment of the foregoing method, further comprising: rotating a second crankshaft connected to eight second pistons, wherein each second piston is positioned in one of eight second cylinders, wherein each second cylinder includes: a second inlet including a second inlet valve for receiving select fluid from a corresponding first separator member; a third inlet including a third inlet valve for receiving select fluid from a corresponding second separator member; and a third select outlet including a third outlet valve for the select fluid; and removing select fluid through the third outlet valve of one second cylinder while its piston is moving towards top dead center; opening a second inlet valve to the one second cylinder; rarefying the one second cylinder while its piston is moving towards bottom dead center to draw select fluid in from the first separator member; closing the second inlet valve to the one second cylinder; and de-rarefying the one second cylinder while its piston is moving towards top dead center to assist in the rotating of the second crankshaft to draw select fluid in from another first separator member corresponding to another second cylinder that is rarefying while its piston is moving towards bottom dead center.

A further embodiment of any of the foregoing methods, wherein the second crankshaft is synchronized with the first crankshaft such that a first piston is at top dead center when a corresponding second piston is at bottom dead center.

A further embodiment of any of the foregoing methods, wherein: the target component is carbon dioxide ($CO_2$); the separator member is a sorbent material that prefers carbon dioxide; and compressing mixed fluid against the separator member of the one first cylinder results in carbon dioxide being sorbed by the separator member.

A further embodiment of any of the foregoing methods, further comprising opening the first inlet valve prior to the first cylinder piston reaching bottom dead center during the decompressing to allow mixed fluid to enter the first cylinder.

A compressible fluid separator pump having a Wankel-type configuration, according to an exemplary embodiment of this disclosure, among other possible things, includes: a housing including: a cavity; an inlet for mixed fluid that is fluidly connected to the cavity, wherein the mixed fluid comprises a target component and a discharge component; a reject outlet for reject fluid that is fluidly connected to the cavity; and a select outlet for the select fluid that is fluidly connected to the cavity, wherein the select outlet includes a separator member that prefers the target component over the discharge component such that the target component is at a higher concentration in the select fluid than in the mixed fluid and in the reject fluid; wherein the inlet and the reject outlet are on one side of the housing and the select outlet is on an opposite side of the housing; a rotatable shaft passing through the housing; and an eccentric rotor rotatably connected to the shaft and having a triangular shape with curved sides, wherein the eccentric rotor orbitally revolves within the housing such that decompression of reject fluid on one side of the eccentric rotor assists in compression of mixed fluid on another side of the eccentric rotor.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A compressible fluid separator pump comprising:
a crankshaft;
four cylinders, wherein each cylinder includes:
an inlet including an inlet valve for mixed fluid comprising a target component and a discharge component;
a reject outlet including a reject valve for a reject fluid; and
a select outlet for a select fluid, wherein each of the select outlets includes a separator member that prefers the target component over the discharge component such that the target component is at a higher concentration in the select fluid than in the mixed fluid and in the reject fluid; and
four pistons, wherein each piston:
is connected to the crankshaft; and
is positioned in one of the four cylinders;
wherein the crankshaft is configured to position two of the pistons at top dead center when the other two of the pistons are at bottom dead center.

2. The compressible fluid separator pump of claim 1, wherein:
the target component is carbon dioxide ($CO_2$); and
the separator member is a membrane that prefers $CO_2$.

3. The compressible fluid separator pump of claim 1, wherein the select outlet further comprises a select valve.

4. A two-stage compressible fluid separator system comprising:
the compressible fluid separator pump of claim 1; and
another compressible fluid separator pump configured in accordance with claim 1;
wherein the select outlet for each cylinder of the compressible fluid separator pump is fluidly connected to an inlet for a corresponding cylinder of the another compressible fluid separator pump.

5. The compressible fluid separator pump of claim 1, wherein each inlet is configured to be fluidly connected to an inlet manifold.

6. The compressible fluid separator pump of claim 5, wherein the inlet manifold is configured to be fluidly connected to an exhaust of a combustion system.

7. The compressible fluid separator pump of claim 1, wherein each select outlet is configured to be fluidly connected to a select manifold.

8. The compressible fluid separator pump of claim 1, further comprising a motor connected to the crankshaft to assist in moving the pistons.

9. The compressible fluid separator pump of claim 8, further comprising a flywheel connected to the crankshaft.

10. A method of operating a compressible fluid separator pump, the method comprising:
rotating a crankshaft connected to four pistons, wherein each piston is positioned in one of four cylinders, wherein each cylinder includes:
an inlet including an inlet valve for mixed fluid comprising a target component and a discharge component;
a reject outlet including a reject valve for the reject fluid; and
a select outlet for the select fluid, wherein each of the select outlets includes a separator member that prefers the target component over the discharge component such that the target component is at a higher concentration in the select fluid than in the mixed fluid and in the reject fluid;
opening an inlet valve to one cylinder of the four cylinders while its piston is moving towards bottom dead center to draw mixed fluid into the one cylinder;
closing the inlet valve to the one cylinder;
compressing mixed fluid against the separator member of the one cylinder while its piston is moving towards top dead center; and
decompressing the one cylinder while its piston is moving towards bottom dead center to assist in the rotating of the crankshaft to compress mixed fluid against a separator member of another cylinder while its piston is moving towards top dead center.

11. The method of claim 10, wherein:
the target component is carbon dioxide ($CO_2$);
the separator member is a membrane that prefers carbon dioxide; and
compressing mixed fluid against the separator member results in carbon dioxide passing through the separator member.

12. The method of claim 10, further comprising opening the reject valve to the one cylinder prior to its piston reaching bottom dead center during the decompressing to allow reject fluid to enter the one cylinder.

13. The method of claim 10, further comprising opening the inlet valve to the one cylinder prior to its piston reaching bottom dead center during the decompressing to allow mixed fluid to enter the one cylinder.

14. A compressible fluid separator pump comprising:
a first crankshaft;
eight first cylinders, wherein each first cylinder includes:
a first inlet including a first inlet valve for mixed fluid comprising a target component and a discharge component;
a first select outlet with a first outlet valve for the select fluid, wherein each of the first select outlets includes a first separator member that prefers the target component over the discharge component such that the target component is at a higher concentration in the select fluid than in the mixed fluid and in the reject fluid; and
a second select outlet with a second outlet valve for the select fluid, wherein each of the second select outlets includes a second separator member that prefers the target component over the discharge component such that the target component is at a higher concentration in the select fluid than in the mixed fluid and in the reject fluid; and
eight first pistons, wherein each first piston:
is connected to the first crankshaft; and
is positioned in one of the eight first cylinders;
wherein the first crankshaft is configured to position four of the first pistons at top dead center when the other four of the first pistons are at bottom dead center.

15. The compressible fluid separator pump of claim 14, further comprising:
a second crankshaft;
eight second cylinders, wherein each second cylinder includes:
  a second inlet including a second inlet valve for receiving select fluid from a corresponding first separator member;
  a third inlet including a third inlet valve for receiving select fluid from a corresponding second separator member; and
  a third select outlet including a third outlet valve for the select fluid; and
eight second pistons, wherein each second piston:
  is connected to the second crankshaft; and
  is positioned in one of the eight second cylinders;
  wherein the second crankshaft is synchronized with the first crankshaft such that a first piston is at top dead center when a corresponding second piston is at bottom dead center.

16. The compressible fluid separator pump of claim 14, wherein:
the target component is carbon dioxide ($CO_2$); and
the separator member is a sorbent material that prefers carbon dioxide.

17. The compressible fluid separator pump of claim 14, wherein each of the first cylinders includes a reject outlet including a reject valve for the reject fluid.

18. The compressible fluid separator pump of claim 14, wherein each inlet is fluidly connected to an exhaust of a combustion system.

19. The compressible fluid separator pump of claim 14, further comprising a motor connected to the crankshaft to assist in moving the pistons.

20. A method of operating a compressible fluid separator pump, the method comprising:
rotating a first crankshaft connected to eight first pistons, wherein each first piston is positioned in one of eight first cylinders, wherein each first cylinder includes:
  a first inlet including a first inlet valve for mixed fluid comprising a target component and a discharge component;
  a first select outlet including a first outlet valve for the select fluid, wherein each of the first select outlets includes a first separator member that prefers the target component over the discharge component such that the target component is at a higher concentration in the select fluid than in the mixed fluid and in the reject fluid; and
  a second select outlet including a second outlet valve for the select fluid, wherein each of the second select outlets includes a second separator member that prefers the target component over the discharge component such that the target component is at a higher concentration in the select fluid than in the mixed fluid and in the reject fluid;
opening a first inlet valve to one first cylinder while its piston is moving towards bottom dead center to draw mixed fluid into the one cylinder;
closing the first inlet valve to the one first cylinder;
opening the first select outlet valve;
compressing mixed fluid against the separator member of the one first cylinder while its piston is moving towards top dead center; and
decompressing the one first cylinder while its piston is moving towards bottom dead center to assist in the rotating of the first crankshaft to compress mixed fluid against a separator member of another first cylinder while its piston is moving towards top dead center.

21. The method of claim 20, further comprising:
rotating a second crankshaft connected to eight second pistons, wherein each second piston is positioned in one of eight second cylinders, wherein each second cylinder includes:
  a second inlet including a second inlet valve for receiving select fluid from a corresponding first separator member;
  a third inlet including a third inlet valve for receiving select fluid from a corresponding second separator member; and
  a third select outlet including a third outlet valve for the select fluid; and
removing select fluid through the third outlet valve of one second cylinder while its piston is moving towards top dead center;
opening a second inlet valve to the one second cylinder;
rarefying the one second cylinder while its piston is moving towards bottom dead center to draw select fluid in from the first separator member;
closing the second inlet valve to the one second cylinder; and
de-rarefying the one second cylinder while its piston is moving towards top dead center to assist in the rotating of the second crankshaft to draw select fluid in from another first separator member corresponding to another second cylinder that is rarefying while its piston is moving towards bottom dead center.

22. The method of claim 21, wherein the second crankshaft is synchronized with the first crankshaft such that a first piston is at top dead center when a corresponding second piston is at bottom dead center.

23. The method of claim 20, wherein:
the target component is carbon dioxide ($CO_2$);
the separator member is a sorbent material that prefers carbon dioxide; and
compressing mixed fluid against the separator member of the one first cylinder results in carbon dioxide being sorbed by the separator member.

24. The method of claim 20, further comprising opening the first inlet valve prior to the first cylinder piston reaching bottom dead center during the decompressing to allow mixed fluid to enter the first cylinder.

25. A compressible fluid separator pump having a Wankel-type configuration comprising:
a housing including:
  a cavity;
  an inlet for mixed fluid that is fluidly connected to the cavity, wherein the mixed fluid comprises a target component and a discharge component;
  a reject outlet for reject fluid that is fluidly connected to the cavity; and
  a select outlet for the select fluid that is fluidly connected to the cavity, wherein the select outlet includes a separator member that prefers the target component over the discharge component such that the target component is at a higher concentration in the select fluid than in the mixed fluid and in the reject fluid;
  wherein the inlet and the reject outlet are on one side of the housing and the select outlet is on an opposite side of the housing;
a rotatable shaft passing through the housing; and an eccentric rotor rotatably connected to the shaft and having a triangular shape with curved sides, wherein the eccentric rotor orbitally revolves within the housing such that decompression of reject fluid on one side of the eccentric rotor assists in compression of mixed fluid on another side of the eccentric rotor.

* * * * *